US012377597B2

(12) United States Patent
Lettowsky et al.

(10) Patent No.: US 12,377,597 B2
(45) Date of Patent: Aug. 5, 2025

(54) METHOD FOR MONITORING A PRODUCTION PROCESS, METHOD FOR INDIRECTLY DEDUCING A SYSTEMATIC DEPENDENCY, METHOD FOR ADAPTING QUALITY, METHOD FOR STARTING A PRODUCTION PROCESS, METHOD FOR PRODUCING AN EXTRUSION PRODUCT AND SYSTEM FOR PRODUCING AN EXTRUSION PRODUCT

(71) Applicant: Reifenhäuser GmbH & Co. KG Maschinenfabrik, Troisdorf (DE)

(72) Inventors: Christoph Lettowsky, Aachen (DE); Thomas Fett, Troisdorf (DE); Mark Hilgers, Troisdorf (DE); Jens Mager, Cologne (DE); Andreas B. Rösner, Bonn (DE); Christian Stelter, Ingelheim (DE); Asmir Vodencarevic, Fürth (DE); Paul Walach, Troisdorf (DE); Hans-Georg Geus, Niederkassel (DE); Michael Nitschke, Königswinter (DE); Martin Neuenhofer, Rösrath (DE)

(73) Assignee: REIFENHÄUSER GMBH & CO. KG MASCHINENFABRIK, Troisdorf (DE)

( * ) Notice: Subject to any disclaimer, the term of this patent is extended or adjusted under 35 U.S.C. 154(b) by 507 days.

(21) Appl. No.: 16/340,524

(22) PCT Filed: Oct. 18, 2017

(86) PCT No.: PCT/DE2017/000347
§ 371 (c)(1),
(2) Date: Apr. 9, 2019

(87) PCT Pub. No.: WO2018/072773
PCT Pub. Date: Apr. 26, 2018

(65) Prior Publication Data
US 2020/0047391 A1   Feb. 13, 2020

(30) Foreign Application Priority Data
Oct. 18, 2016   (DE) .................... 10 2016 012 476.8

(51) Int. Cl.
*B29C 48/92*   (2019.01)
*B29C 48/08*   (2019.01)
*G05B 19/418*   (2006.01)

(52) U.S. Cl.
CPC ............. *B29C 48/92* (2019.02); *B29C 48/08* (2019.02); *G05B 19/41875* (2013.01); *B29C 2948/92114* (2019.02); *B29C 2948/92247* (2019.02); *G05B 2219/32179* (2013.01)

(58) Field of Classification Search
CPC ..................................................... B29C 48/92
See application file for complete search history.

(56) References Cited

U.S. PATENT DOCUMENTS

| 3,890,078 | A | * | 6/1975 | Straumanis | B29C 48/92 |
| | | | | | 425/141 |
| 4,882,104 | A | * | 11/1989 | Dobrowsky | B29C 48/86 |
| | | | | | 264/40.1 |
| 2004/0225484 | A1 | | 11/2004 | Hamann | |
| 2005/0080507 | A1 | * | 4/2005 | Silberg | B29C 48/2694 |
| | | | | | 700/196 |
| 2005/0194705 | A1 | * | 9/2005 | Smith | B29B 7/7461 |
| | | | | | 264/40.1 |
| 2006/0100737 | A1 | * | 5/2006 | Pohlmann | B29C 48/92 |
| | | | | | 700/196 |
| 2006/0138690 | A1 | * | 6/2006 | Schwaiger | B29C 48/92 |
| | | | | | 264/40.6 |
| 2007/0179765 | A1 | * | 8/2007 | Hyun | G06F 30/23 |
| | | | | | 703/9 |
| 2010/0065979 | A1 | * | 3/2010 | Betsche | B29C 48/92 |
| | | | | | 264/40.6 |

(Continued)

FOREIGN PATENT DOCUMENTS

| CN | 101813936 A | 8/2010 |
| CN | 104054032 A | 9/2014 |

(Continued)

OTHER PUBLICATIONS

Snorre Kjorstad Fjeldbo et al., Through-process sensitivity analysis on the effect of process variables on strength in extruded Al—Mg—Si alloys; Sep. 6, 2011; Journal of Materials Processing Technology 212 (2012) , pp. 171-180 (Year: 2011).*
M. McAfee, Enhancing process insight in polymer extrusion by grey box modelling, 2007, Transactions of the Institute of Measurement and Control 29, 5 (2007) pp. 467-488 (Year: 2007).*
Brazilian Office Action dated Aug. 12, 2021; 4 pgs.
International Search Report for corresponding international application No. PCT/DE2017/000347, dated Apr. 11, 2018.
Herrmann H: "Auf Dem Weg Zur Flexiblen und Intelligenten Aufbereitungsanlage", Kunststoffe, Carl Hanser Verlag, 1 Munchen, DE, Bd. 78, Nr. 10, Oct. 1, 1988 (Oct. 1, 1988), Seiten 876-884, XP000052617, ISSN: 0023-5563 das ganze Dokument.
Smith, Douglas E.; "Design Sensitivity Analysis and Optimization for Polymer Sheet Extrusion and Mold Filing Processes", International Journal for Numerical Methods in Engineering, Int. J. Numer. Meth. Engng 2003; 57:1381-1411, Department of Mechanical and Aerospace Engineering, University of Missouri-Columbia, Columbia, MO 65211, DOI: 10.1002/nme.782, XP071315557 A.

(Continued)

*Primary Examiner* — Jeffrey M Wollschlager
(74) *Attorney, Agent, or Firm* — Tarolli, Sundheim, Covell & Tummino LLP

(57) ABSTRACT

The invention relates to various aspects in the production of extrusion products. The properties of extruded articles are dependent significantly, in addition to their formulation, also on the setting variables and in particular on the thus resulting process variables. The setting variables and in particular the process variables thus represent a state of the extrusion process characterized as "fingerprint". The thus claimed invention takes into account these facts and supports the operator of a production plant to detect earlier changes in quality and to systematically counteract a deterioration in the quality.

15 Claims, 1 Drawing Sheet

(56) References Cited

U.S. PATENT DOCUMENTS

| | | | | |
|---|---|---|---|---|
| 2013/0147076 A1* | 6/2013 | Chandrasekaran | ..... | G01B 11/00 |
| | | | | 264/40.1 |
| 2013/0270728 A1 | 10/2013 | Denes | | |
| 2014/0264991 A1* | 9/2014 | Hwang | ................. | B29C 48/92 |
| | | | | 264/40.5 |
| 2014/0328884 A1* | 11/2014 | Reyes | ................... | B29C 47/92 |
| | | | | 424/401 |
| 2016/0009014 A1* | 1/2016 | Schmitz | ................ | B29C 48/49 |
| | | | | 264/40.1 |
| 2016/0089806 A1* | 3/2016 | Takeuchi | ................ | B26D 5/02 |
| | | | | 83/365 |
| 2019/0009439 A1* | 1/2019 | Schmitz | ................. | B29C 41/50 |

FOREIGN PATENT DOCUMENTS

| | | |
|---|---|---|
| CN | 104955631 A | 9/2015 |
| CN | 109313739 A | 2/2019 |
| DE | 3937273 A1 | 5/1990 |
| DE | 69326978 T2 | 4/2001 |
| DE | 102010029757 A1 | 12/2011 |
| DE | 102013100866 A1 | 7/2014 |
| JP | 2008119991 A | 5/2008 |
| WO | 2012171513 A1 | 12/2012 |
| WO | 2013143801 A1 | 10/2013 |
| WO | WO21015089231 * | 6/2015 |

OTHER PUBLICATIONS

Baumgardner, Gaylon Lynn; "Characterization and implementation of ground tire rubber as post-consumer polymers for asphalt concrete", A Dissertation Submitted to the Faculty of Mississippi State University in Partial Fulfillment of the Requirements for the Degree of Doctor of Philosophy in Civil Engineering in the Department of Civil and Environmental Engineering, Mississippi State, Mississippi, Dec. 2015, XP055563299 A.

Fjeldbo, et al.; "Through-Process Sensitivity Analysis on the Effect of Process Variables on Strength in Extruded Al—Mg—Si Alloys", Journal of Materials Processing Technology 212 (2012) 171-180, pp. 171-180.

* cited by examiner

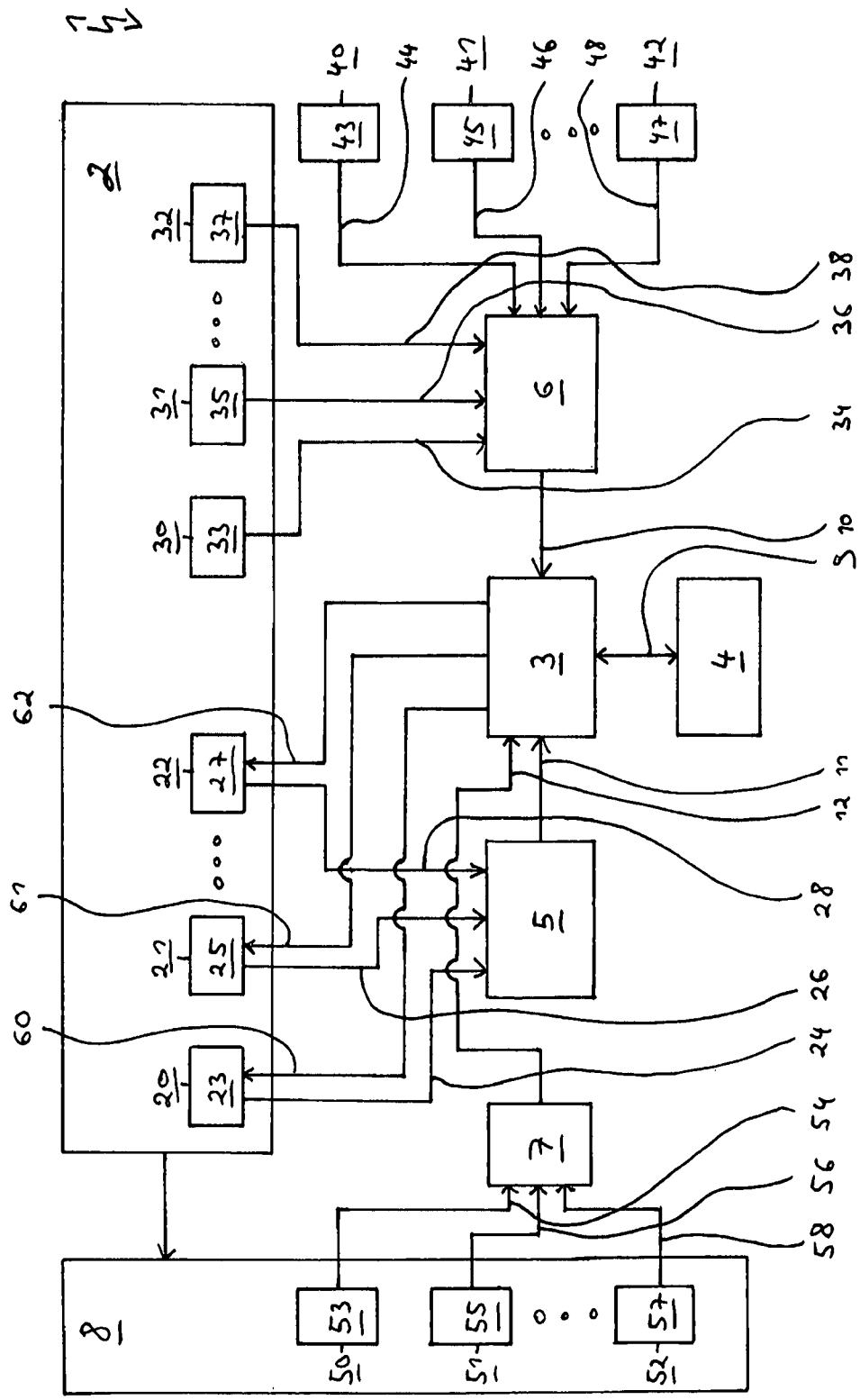

METHOD FOR MONITORING A PRODUCTION PROCESS, METHOD FOR INDIRECTLY DEDUCING A SYSTEMATIC DEPENDENCY, METHOD FOR ADAPTING QUALITY, METHOD FOR STARTING A PRODUCTION PROCESS, METHOD FOR PRODUCING AN EXTRUSION PRODUCT AND SYSTEM FOR PRODUCING AN EXTRUSION PRODUCT

RELATED APPLICATIONS

The present invention is a U.S. National Stage under 35 USC 371 patent application, claiming priority to Serial No. PCT/DE2017/000347, filed on 18 Oct. 2017 which claims priority of DE 10 2016 012 476.8, filed on 18 Oct. 2016, the entirety of both of which are incorporated herein by reference.

The invention relates to a method for monitoring a production process, a method for indirectly deducing a systematic dependency, a method for adapting quality, a method for producing an extrusion product and a unit for producing an extrusion product. In particular, the invention relates to a method of monitoring a production process for an extrusion product by means of a production facility, a method of indirectly deducing a systematic dependency in a production process for an extrusion product, a method for adapting the quality of an extrusion product manufactured with a production facility, a method for starting a production process, a method for producing an extrusion product and a system for producing an extrusion product.

The properties of extruded articles substantially depend, in addition to the formula, on the setting parameters and, above all, on the process variables resulting therefrom.

An alteration of the properties of the extruded product is frequently preceded by an alteration of the process variables. At the beginning of production, the operator of an extrusion facility nowadays sets the process variables in such a way that the final product, i. e. the extrudate, can be deemed acceptable. This state of production, which in the following will be called "fingerprint", can be characterized by means of the setting parameters and, in particular, by means of the resulting process variables.

For the production of extruded articles of high quality, it is desirable to detect an impermissible alteration of the properties of the extrusion product at an early stage. An alteration of the properties of the extrusion product correlates with an alteration of the process variables.

Some control systems of modern extrusion facilities signal deviations of the setting parameters from a setting parameter desired value.

DE 10 2013 100 866 A1 describes a method for indirectly determining a specific formulation for an extrusion method in an extrusion facility, where for determining the formulation, the production state is taken into account as well.

Other disclosures can be found in WO 2017/174232 A1 and in WO 2017/174223 A1.

The invention is based on the task of providing the state of the art with an improvement or an alternative.

In a first aspect of the invention, the task is solved by a method for monitoring a production process for an extrusion product by means of a production facility, a measured value, in particular a process variable of the production process, being determined by means of a sensor, and a measured value acquired in this manner being compared with a predefined desired value of the measured value, in particular a process value acquired in this manner with a predefined process desired value, a setting parameter being determined and a thus acquired setting parameter actual value of the production facility acquired from a production of the extrusion product being compared with a predefined setting parameter desired value, and a deviation of the setting parameter actual value from the setting parameter desired value, and/or a deviation of the measured value from the desired value of the measured value being indicated.

Some terminology will be explained in the following:

First it is explicitly pointed out that in the context of the present patent application, indefinite articles and numerals such as "one", "two" etc. are normally to be understood as indicating a minimum, i. e. "at least one . . . ", "at least two . . . " etc., unless it becomes explicitly clear from the context or unless it is obvious to the person skilled in the art or technically mandatory that only "exactly one . . . ", "exactly two . . . " etc. can be intended.

A "production process" or "production" is the transformation of natural or pre-fabricated raw materials into a product by means of energy and a "production facility". In particular, a product can be an extruded article, an extrusion product or an extrudate.

An "extruded article", frequently also called "extrusion product" or "extrudate", is a product manufactured from a thermoplastic material. Such products can be quasi-finished goods of all types, but also final products. Plastic profiles, film webs, panel material and all other types of thermoplastic products extruded from a granulate are conceivable. Sheet materials can also be intended.

A "film web" can either be a one-layered film web or a tubular film web, where the tube can either be cut or retain its original shape. A folded tube can also be termed "film web". The film web can be one-layered or multi-layered.

The term "sheet materials" designates a class of products, in particular quasi-finished goods in the form of plastic sheets. Examples of sheet materials are one-layered film webs, tubular film webs, where the tube can be cut open or retain its original shape, folded film webs and flat sheets made from fibers of limited or unlimited length. Film webs can be one-layered or multi-layered. Examples of products made from sheet materials are candy packages, diapers, agricultural sheets and plastic bags.

A "sensor" or "detector" is a technical component which can detect and certain physical or chemical properties and/or the material properties of its environment, either qualitatively or in terms of quantity as a "measured variable". These parameters are recorded by means of physical or chemical effects and are transformed into an alaog or digital electrical signal.

In particular, a "sensor" can also be intended to mean a virtual sensor in this context. A "virtual sensor" maps the data of one or more detected measured variables, concerning a physical or chemical property and/or the material characteristics of the environment, in terms of quality or quantity by means of a mapping function. A sensor can be either be a physically existing sensor or a virtual sensor detecting a property and/or a material characteristic of its environment qualitatively or quantitatively. In other words, a virtual sensor determines a value, in particular a measured value, a setting parameter or a process value, by means of a mathematical rule.

A "measured value" is the current value of a "measured variable". A "desired value of the measured value" is the default value of a measured variable. A measured variable can be any variable which is measured or detected visually by the operator. In particular, by a measured variable, a setting parameter, a process variable or a variable describing a property of the extrusion product can be intended, in particular an optical property, a geometrical property and/or a functional property of an extrusion product.

A "process value" is the current value of a "process variable". A "desired process variable" is the default value of a "process variable". Examples of setting parameters of an extruder are an extrusion pressure, a melting temperature of the extrudate and a conveying rate of an extruder.

A "setting parameter desired value" is the default value of an actuator for setting a "setting parameter". The current value of the setting parameter is an "setting parameter actual value". Examples of setting parameters of an extruder are a set cylinder wall temperature, a set extrusion speed and a set rotational speed of the extruder.

Conceptually it is noted that "Determining a value", in particular a measured value, a process value or the value of a setting parameter, means that an actual value of a variable is determined in the form of a numeral. A value can be determined by means of a sensor or calculated by means of a mathematical and/or physical and/or chemical rule.

A "deviation" is understood as being the difference between a desired value, in particular a setting parameter desired value or a process desired value, and an actual value, in particular a thus acquired setting parameter actual value or an actual process value.

During tool setting or start-up of a production facility for an extrudate, the operator of the production facility in the state of the art sets the setting parameters such that the extrusion product is deemed acceptable by the operator and/or by a laboratory, using optical impressions and/or measured values. In other words, the setting parameters of the production facility are varied until the extrusion product has an acceptable quality and thus acceptable properties.

Each state of production can be characterized by means of the current setting parameter actual values and the current process actual values. The sum of all setting parameter actual values and all actual process values can also be termed the "fingerprint" of the production process.

An alteration of the properties of an extrusion product is frequently preceded by an alteration of a process value. This has been recognized by the inventors and is used to advantage.

In the manufacture of extrusion products, it is particularly desirable to detect at an early stage whether a property of an extrusion product is being altered in an undesired or impermissible manner.

As has now been recognized by the inventors, such an alteration of a property correlates with an alteration of a process value such that a property of the extrusion product can be deduced from the process values of the production process.

The state of the art until now has provided for the operator of a production facility for an extrusion product to generally acquire empirical values with the production facility by manually noting down the values of individual setting parameters and process variables of the production facility as well as properties of the extrusion product and by evaluating them by methods individually established.

Using these individual experiences as a starting point, the operator starts up the production facility during an initialization process and operates it for manufacturing extrusion products.

With a production facility, different extrusion products can normally be produced which in addition have different properties. Also, different final customers of production facilities manufacture different extrusion products with different formulations and possibly also on different production sites. This leads to very different and specific types of experience gathered by different operators, which so far have not been agglomerated in the state of the art.

In the state of the art, production facilities are known which signal a deviation of a thus acquired setting parameter actual value from a setting parameter desired value to the operator. The operator does not draw conclusions on the properties of the extrusion product using his specific individual experiences.

An agglomeration of the different experiences gathered by the individual operators takes place via communication between the operators. This communication is naturally subject to spatial, temporal and communication-dependent barriers.

If an operator detects a deviation between a thus acquired setting parameter actual value and a setting parameter desired value which he has defined based on his own experience, he will decide, in the state of the art, whether the extrusion product which has just been produced can be used as originally planned in spite of the detected deviation, or whether it must be put to a different use.

In deviation from this, it is proposed here that an actual value of a measured variable, in particular a setting parameter and/or a process variable, be determined and at least partially stored continuously or in defined time intervals.

During this process, an actual value of a setting parameter and/or a process variable can be determined either automatically, by means of adapted sensors, or manually by the operator. In case of manual detection, the value can be transferred into a data processing and evaluation unit, either directly or with time delay.

In a particularly preferred embodiment, an actual value of a setting parameter and/or a process variable of the production facility is automatically determined by means of adapted sensors and compared to known desired values. Deviations between actual values and desired values are automatically recognized and directly signalled to the operator of the production facility and/or to the higher-level plant monitoring authority.

It is also proposed to compare a respective fingerprint of the production facility with known comparative data of other fingerprints of the same production facility or of other similar production facilities, either manually or automatically.

Concretely it is also conceivable that existing comparative data are supplemented by the a newly collected fingerprint. This method is particularly advantageous if the new fingerprint of the production facility results in an extrusion product which has the desired property of the extrusion product.

Thus, it is also conceivable, for instance, that by means of the existing comparative data for an extrusion product with well-defined requirements on at least one property of the extrusion product, a sensitivity analysis of the current fingerprint is performed. In this manner, the sensitivity of the fingerprint of the production process in terms of at least one desired property of the extrusion product can be analyzed.

It is also proposed to proactively intervene in the production process using the acquired sensitivity of the production process to the fingerprint and the current value of the fingerprint. The desired value of a setting parameter is to be adapted in the electronic plant system in case of an electronic open-loop or closed-loop control of the production facility and, in case of a manual control of the production facility, by the operator. This adaptation is to take place such that a deviation between a thus acquired setting parameter actual value and/or an actual process value and a setting parameter desired value and/or a process desired value can increase before an extrusion product must be put to a different use.

For a particularly preferred embodiment, it is proposed to also calculate the value of a setting parameter and/or a process variable by means of an existing model, where one or more existing setting parameters and/or process variables which deviate from the variable to be calculated can be used as input variables for the model. Thus, a model can help to determine whether a defined setting parameter and/or process variable lies within the range of expectation determined by the model and is consistent therewith or if the measuring techniques and/or the data processing and/or evaluation of data should be subjected to a test.

It is also conceivable that based on the collected data, the operator is provided with a context-sensitive support system which points out special events in the data to the operator of the production facility and/or which provides instructions, depending on requirements, as to how normal operation of the production facility can be restored when deviations have been detected.

It is proposed that such instructions be given to the operator in a context-sensitive manner. This may mean, among others, that only part of the available information is provided to him and that he can be provided with unequivocal instructions on how to act.

In this context, it is also conceivable that for starting a production facility, the operator of a production facility is provided with instructions on specific procedures by a context-sensitive support system which procedures are to be followed in dependence on the recorded data. Context-sensitivity can here be adapted to contain a temporal element which decides on the steps to be performed by the operator and, for this decision, takes into account the development of an available variable, in particular a setting parameter and/or a process variable.

Thus, it is conceivable, for instance, that the operator is enabled to perform a specific process-oriented sequence or a step of a sequence for controlling a production facility only if a specific condition is fulfilled which is also evaluated in dependence on at least one recorded value, especially in dependence on an actual value of a setting parameter and/or a process variable. Such a procedure cannot only be used for starting up a production facility but also, as a specific embodiment of a method, for other operational steps in connection with the operation of the production facility.

Advantageously, it can be achieved in this manner that the operator of a production facility is supported in his work, which reduces his workload and improves the results of the work. Changes in the actual values of a setting parameter and/or a process variable of a production facility are signalled to the operator at an early stage so that the operator can also react early to alterations of a property of the extrusion product, guided by a context-sensitive support system, if necessary. As a whole, in this manner, the production of the extrusion product can be made less sensitive to any disruptive influences. The necessity of putting an extrusion product to a different use than originally planned can be avoided in this manner, lowering the costs of the product and/or of the production process.

Preferably, the setting parameter desired value and/or the desired value of the measured value are defined in dependence on a production process parameter.

Some terminology will be explained in the following:

A "production process course parameter" is a parameter of the production process which describes the current state of the production process, similar or comparable to a temporal process parameter. A "production process course" describes the change of state of the production over time. A "production state" is the state of one or more variables of the production, in particular one or more measured variables, especially one or more setting parameters and/or one or more process variables. During startup of a production facility, a state variable of production, for instance, can change in the production process, resulting in a variable course of the production process until a stationary production process is reached. In the exemplary case of startup of a production facility, the production process course parameter describes the current state of the production facility in the course of the production process. In addition to the startup of the production facility, there can be one or more other production process developments whose states can also be described by means of production process development parameters. In the case of a quasi-stationary production process, the production process development parameter can in particular vary continuously.

It is specifically proposed here to define the development of an actual value of a setting parameter and/or a process variable in dependence on a production process development parameter. The operator can do this, for example, by triggering a function in case of certain events which stores the respective actual values in the desired order.

In a particularly preferred embodiment, it is concretely the case and also conceivable, among others, that during startup or shutdown of a production facility within the framework of closing down a production facility or in case of a change of extrusion product in a production facility, an actual value of a setting parameter and/or of a process variable is recorded and/or stored in dependence on a production process development parameter. In other words, a track of fingerprints is recorded by defined waypoints, which track can be followed by the same or by a different operator during a similar process at a different time, either manually or in an automated manner.

Upon this, a track of fingerprints can be stored, loaded and managed by means of discrete waypoints. In particular, this makes it possible to copy the experience of a particularly experienced operator with particularly good results and to transfer this experience to a less experienced operator or an operator in a different region in the form of a track of fingerprints, since the latter can reproduce the waypoints during startup or shutdown of a production facility or in case of a change of extrusion product in a production facility at any time.

Of course, it should be mentioned here that the method can be applied to any types of processes during operation of a production facility.

The functionality proposed here can also be advantageously combined with a context-sensitive support system for the operator of the production facility.

A time tagging of the recorded data has proved to be very helpful.

Thus, it is specifically proposed here, among other things, that in addition to dependence on the production process development parameter, the operator can set a time tag in the recorded data. This tagging will later allow him to find a specific position in the data more quickly. The operator can label a specifically selected event to make it more easily retrievable. This advantageously allows a quicker access to these data and targeted coordination, for instance with another operator, concerning the experiences gathered on this specific event at this special point in time.

In this connection it is concretely conceivable, for example, that both the tagging of a point in time at which a special event has occurred to the operator and/or the tagging of a point in time at which a property of the extrusion product was particularly good or particularly bad, are carried out.

It is also proposed here to not only provide the data with a time tag but also attach a label synchronized with the time of the event to the extrusion product. Thus, the product or the specific position on or in the extrusion product can be assigned to the event at a later point in time and examined specifically.

As a whole, this can advantageously simplify and accelerate the service support, help to eliminate problems more quickly or to share information on special events including the corresponding experiences and product properties.

Advantageously, it can be achieved in this manner that support, which may also be context-sensitive, is provided to the operator, facilitating work for him, especially during the startup or shutdown processes of a production facility or with a change of extrusion product in a production facility. This can help to accelerate processes and improve productivity of the production facility and of the operator and to reduce the production of rejections.

Also, advantageously the empirical values collected by a staff member can be rendered measurable, available and able to be transferred. In addition, such support reduces the strain on the cognitive abilities of an operator.

Furthermore, the collected data advantageously also allow an automated change of product.

It is conceivable to concretely evaluate the energy efforts for startup, for shutdown, for operation of a production facility or for change of the extrusion product in a production facility and to propose or perform the most energy-efficient operational strategy for the respective situation.

On the whole, thus, advantageously the invention can provide support to inexperienced operating staff, reduce rejections and/or accelerate a change of extrusion product.

In a second aspect of the invention, the task is achieved by a method for monitoring a production process for an extrusion product by means of a production facility, with a measured value, in particular a process value of the production process, being determined by means of a sensor, and being compared to a predefined desired value of the measured value, in particular a predefined process desired value, a setting parameter being determined and a thus acquired setting parameter actual value of the production facility, acquired from production of the extrusion product, being compared to a predefined setting parameter desired value, a deviation of at least the setting parameter actual value from the setting parameter desired value and/or of the measured value from the desired value of the measured value being signalled; in particular, a method according to a first aspect of the invention, where the setting parameter desired value and/or the desired value of the measured value are defined for a stationary or quasi-stationary production process.

Some terminology will be explained in the following:

By a "stationary" production process, a production process is intended whose state values, in particular the measured values, the setting parameter values and/or the process values, do not change over the course of time. In particular, the starting process of the production facility has been concluded if the production process is stationary.

A "quasi-stationary" production process is a production process in which at least one state variable, in particular a measured variable, a setting parameter or a process variable, exhibit an oscillation about a constant median value and with a constant amplitude over the course of time. In particular, the starting process of the production facility has been concluded if the production process is quasi-stationary.

As has already been explained in connection with the first aspect of the invention, the state of the art so far has provided, briefly said, for an operator of a production facility to gain individual experience over the years. The operator manually notes down the values of different setting parameters and process variables of the production facility as well as properties of the extrusion product and evaluates them manually by means of individually established methods, depending on his individual requirements.

The operator operates the production facility known to him using his individual experience. A systematic exchange of empirical values between a plurality of operators, or operators working on different sites, accordingly requires a large amount of effort and is possible only with limitations.

It has been shown that the previously defined fingerprint of a production process can be transmitted if similar extrusion products are manufactured in similar production facilities.

Therefore, it is now specifically proposed here, among others, to store a fingerprint as soon as a stationary or, depending on the boundary conditions of the production process, a quasi-stationary production process has been reached.

Thus, after the startup process of the production device has been completed, that is, as soon as a stationary or quasi-stationary production process has been reached and as soon as the operator is satisfied with the at least one value of a setting parameter predefined by him, since the extrusion product exhibits the desired property in connection with this at least one value, the operator can trigger a function which stores the fingerprint of the production, recording or setting it.

For this purpose, the operator can, for instance, actuate an analogue or digital trigger adapted for this purpose, which ensures that the current fingerprint is stored in the data acquisition and evaluation unit.

This stored fingerprint can then be exchanged between different operators of a production facility or between operators of a group of production facilities, even if they work on different sites, and can be used by all of them. The fingerprint can then be made use of, for example, according to one of the methods proposed here.

In other words, the fingerprint of the production process is the description of how a defined product is manufactured, marking an optimum state of production. Thus, it advantageously can replace the manual notes known in the state of the art.

Other than the values of a formulation (only direct setting parameters), the fingerprint can also store all relevant and measurable process variables as well as the quality parameters of the product (e. g. pinhole counter, 2 sigma), including those values which do not directly represent desired values (e. g. mass temperature, air volume flow, melt pressure in the nozzle).

For instance, the fingerprint of a production process can be displayed and compared in an electronic navigation unit which can also facilitate operation of the machine for the operator, depending on the context. Also, in the case of deviation of process values, the fingerprint of the production process can be displayed for comparison in the navigation menu and evaluated.

In addition, it is proposed that an operator can manually vary or add the data of a fingerprint at any time within an accordingly defined environment within the data acquisition and evaluation unit. In this manner, waypoints within a sequence of fingerprints, or an individual fingerprint, can also be added after processing or edited or deleted for purposes of improvement.

Thus, the second aspect of the invention contains a consistent further development of the first aspect.

Advantageously, in this manner, any desired number of fingerprints of the production can be stored during operation of a production facility.

The fingerprints of the production process can advantageously be combined to sequences of fingerprints (cards) and can be retrieved or initiated for step-by-step approximation to a product.

For specific types of operation, stored sequences of fingerprints can advantageously be combined to form cards, where for instance a fingerprint can be employed or initiated in response to a manual key pressure or in an automatic sequence of fingerprints for individual modes of operation.

In addition, it is proposed here, among others, to prepare, for each production process for an extrusion product, a documentation of the history of states of the available variables and to deliver it to the customer together with the extrusion product.

On the whole, it can advantageously be achieved in this manner that quality control of an extrusion product is substantially improved. This is also achieved by providing, for each production process and thus for each batch or roll of an intermediate product or final product, a documentation of the development over time for at least one setting parameter and/or at least one process variable of the production process. These can also be used in the context of a product certification, providing integrative added value to the customer and increasing the value of the extrusion product through certified quality control.

Preferably, the setting parameter desired value and/or a deviating desired value of the measured value are defined by ranges, in particular in the form of a normal range, a warning range and an alarm range, with the warning range being preferably larger than the normal range and/or the alarm range being preferably larger than the warning range.

Some terminology will be explained in the following:

By a "range", a range of values is intended within which a setting parameter desired value, a desired value of the measured value, a process desired value or a property desired value with a smallest and a largest value still belonging to the range can be defined. In special cases, a "range" may only contain one value for one of the listed measured variables. In such cases, the measured variable lies within this range only if it has exactly this value. The range can be defined by different ranges of numbers, for instance by natural numbers, whole numbers, rational numbers, real numbers or complex numbers.

In particular, the term "normal range" indicates a range within which the measured variable belonging to the range has a normal value; a "warning range" is a range within which the measured variable belonging to the range has a value which causes a warning sent to the operator and/or the plant controller, where the plant controller may send the warning to the operator, and an "alarm range" is a range within which the measured variable belonging to the range has a value which causes an alarm sent to the operator and/or the plant controller, with the plant controller signalling the alarm to the operator.

The term "warning range" is to be intended such that the smallest value of the warning range is smaller than or equal to the smallest value of the normal range defined for this measured variable, and such that the largest value of the warning range is larger than or equal to the smallest value of the normal range defined for this measured variable. Thus, the warning range preferably comprises a larger range of numbers than the normal range. The warning is only to be given, however, if the value of a measured variable lies within the warning range and outside the normal range.

The term "alarm range" is to be intended such that the smallest value of the alarm range is smaller than or equal to the smallest value of the warning range defined for this measured variable and such that the largest value of the alarm range is larger than or equal to the smallest value of the warning range defined for this measured variable. Thus, the alarm range preferably comprises a larger range of numbers than the warning range. The warning is to be triggered if the value of a measured variable lies within the alarm range and outside the warning range.

The wording "setting parameter desired value and/or a deviating desired value of the measured value" is intended to mean at least one setting parameter value or at least one measured value. In particular, the setting parameter desired value can also be a desired value of the measured value as long as the respective setting parameter is also a measured variable.

It is specifically proposed that every value of a measured variable should trigger an alarm provided that this value is outside the corresponding warning range. In particular, the value of the measured variable can also lie outside the respective alarm range for an alarm to be triggered.

It is proposed here that at least one range for each measured variable can be defined by the manufacturer of the production facility and/or by the operator. In particular, a normal range, a warning range and/or an alarm range can be defined for each measured variable.

If only a normal range is defined for a measured variable, an alarm is triggered if the value of the respective variable lies outside the normal range.

If no range is defined for a measured variable at all, it is specifically proposed here that the manufacturer and/or the operator of a production facility decide whether the variable is a non-critical measured variable whose values are never to lead to an alarm, or whether a continuous alarm is maintained during operation of the production facility until at least one range for this measured variable is defined.

A normal range is defined such that a measured variable having a value lying within the normal range corresponds to the expectations of the operator and/or the manufacturer of the production facility. In other words, the normal range for a measured variable is to be defined in such a way that when the value of the variable lies within this range, this is a clear indication that safe operation of the production facility and/or attainment of at least one desired property of the extrusion product can be guaranteed.

The warning range is to be defined by the manufacturer and/or the operator of the production facility such that a value of a measured variable which lies outside the normal range and within the warning range, causing a warning, induces the operator of the production facility to pay increased attention at least with respect to the specific warning. A warning is to be understood as a clear indication that a measured variable has a value which does not meet the expectations of the operator and/or the manufacturer of the production facility. However, the value is not so critical for the production facility or for at least one property of the extrusion product that an alarm would have to be given which normally indicates the necessity of timely intervention in the production process.

The alarm range is to be defined by the manufacturer and/or the operator of the production facility such that a value lying outside the respective warning range can be restored to the normal range by timely action of the operator. The purpose of such action by the operator can be, for instance, to counteract impending damage of the production facility or to prevent that a manufactured extrusion product can only be used for a different purpose than originally intended.

Thus, it is conceivable, for instance, that an alteration of a property of the extrusion product which comes close to the limits of the guaranteed property of the product and which is expected with a certain probability to make the property exceed its limits, is to trigger an alarm. To allow this and provide the operator with an alarm which induces him, for instance, to act early, take countermeasures or initiate a shutdown process, the alarm range is to be selected, correspondingly to the normal range and/or the warning range of the respective measured variable, such that the operator is given sufficient time to react so that, in an optimum case, the value of the measured variable can return to the normal range during ongoing operation of the production facility.

It is specifically proposed that depending on the situation, suitable measures can be proposed to the operator in reaction to an alarm.

Advantageously, in this manner, the operator can be supported in operating a production facility such that on the one hand, he is relieved off workload and such that on the other hand, the quality of the products can be improved. Advantageously, the operator can be unequivocally informed on whether all measured values of a production facility are in accordance with the expectations of the operator and/or the manufacturer of the production facility. Advantageously, this information can be agglomerated in a suitable place, with a context-sensitive operator guidance collecting and summarizing all information which must necessarily be taken into account by the operator.

Furthermore, it can advantageously be achieved, among others, that the operator of a facility is warned early if a measured value leaves the expected range. In this manner, the operator can be warned and can turn his attention to the respective value.

In case of an alarm, it can advantageously be achieved that the operator detects a critical state of the production facility and, in a particularly preferred embodiment, receives requests or recommendations on how to act, depending on the context, in order to be able to counteract in time, for instance, damaging of a production facility or guarantee for example trespassing of the permissible range of a required product characteristic so that the extrusion product can still be used for its intended purpose.

In this manner, altogether, it can advantageously be achieved that the quality of an extrusion product can be guaranteed in a well-documented manner. In addition, the costs of the production process can be lowered since availability of the production facility can be increased by adapted maintenance and a respective alarm in case of critical states. Also, the manufacturing costs of the extrusion product can be reduced since by means of the proposed method, a lesser amount of product must be put to a different use than originally intended.

Optionally, the signalling of the deviation of at least the setting parameter actual value from the setting parameter desired value and/or of the measured value from the desired value of the measured value corresponds with the ranges of the setting parameter desired value and/or of the desired value of the measured value, with a normal state being signalled if the setting parameter actual value and/or the measured actual value lie within the normal range; with a warning state being signalled if the setting parameter actual value and/or the measured actual value lie within the warning range and outside the normal range; and an alarm state being signalled if the setting parameter actual value and/or the measured actual value lie within the alarm range and outside the warning range.

Some terminology will be explained in the following:

A "normal state" is understood as a state in which a variable, in particular a measured variable, a setting parameter or a process variable, has a value lying within the respective normal range.

A "warning state" is understood as a state in which a variable, in particular a measured variable, a setting parameter or a process variable, has a value lying within the respective warning range and outside the corresponding normal range. If a warning state is detected, a warning is given.

An "alarm state" is understood a state in which a variable, in particular a measured variable, a setting parameter or a process variable, has a value lying within the respective alarm range and outside the corresponding warning range. If an alarm state is detected, a warning is given which signals impending danger or calls for increased attention.

It is proposed here that a normal state is signalled to the operator if the values of all measured variables of the production facility lie within the respective normal ranges.

It is also proposed that a warning state is signalled to the operator of a production facility if at least one measured variable has a value lying within the warning range, but outside the normal range, so that the operator can increasingly direct his attention to the respective warning and can, if necessary, take suitable measures for returning the value of the measured variable to the normal range.

Correspondingly, it is proposed that an alarm state is signalled to the operator if at least one measured variable has a value lying within the alarm range, but outside the warning range, so that the operator accordingly can take suitable measures in time for returning the value of the measured variable to the normal range.

Messages can also or alternatively be signalled to a higher ranking implant control system or to a person who in addition to operating the production facility is supposed to handle different tasks.

Advantageously, it can be achieved in this manner that the operator of a production facility receives on overview of whether the production process is executed within the range of the expected parameters, that is, if everything is "all right", implying that he does not have to take any reactive measures and can accordingly focus his attention on other activities.

Furthermore, it can advantageously be achieved that in case a warning state or an alarm state is signalled, the attention of the operator is directed to the production facility and production process within a very short time, such that suitable measures can be taken quickly and efficiently.

Preferably, the setting parameter desired value and/or a deviating desired value of the measured value are defined by an operator of the machine during the production process.

Some terminology will be explained in the following:

An "operator" is the person who is responsible for the production facility, monitors it and who also performs adjustments on the production facility, if necessary.

This means that it is here proposed, among others, that the operator of a production facility can manually set the desired value for a setting parameter or a deviating measured value, or can define it during production.

In this context, it is also possible that the operator can define the desired value for a process variable, since the latter also belongs to the measured variables. An example of a process variable which is not directly counted among the setting parameters, is the temperature of an extrusion cylinder which is reached, for instance, by tempering. If tempering does not comprise closed-loop temperature control, the temperature of the extrusion cylinder is not understood to be a setting parameter by the operator and is therefore considered to be one of the possible measured variables of a production facility.

In particular, it is proposed that the operator can influence the fingerprint of the production facility.

Advantageously, it can be achieved in this manner that the operator can control the production process by manually setting a setting parameter desired value and/or a deviating desired value of the measured value. In this way, the operator can intervene in the production process and alter its parameters according to his desires.

Optionally, the setting parameter desired value and/or a deviating desired value of the measured value can be defined by a data processing and evaluation unit.

Some terminology will be explained in the following:

A "data processing and evaluation unit" is an electronic unit which handles data volumes with the aim of acquiring information on these volumes or to change them. For this purpose, the data are recorded in data sets, processed by man or by a computer with a predefined method and output as a result.

Thus, it is specifically conceivable that the fingerprint of the production process can be defined by a data processing and evaluation unit. This definition, issuing from the unit, can first be authorized by the operator, or it can directly be authorized by the data processing and evaluation unit in an autonomous manner.

Here, it is conceivable, among others, that the data processing and evaluation unit proposes an adaptation of a setting parameter desired value and/or a deviating desired value of the measured value on the basis of the input measured values, using an algorithm for optimizing a setting parameter desired value and/or a deviating desired value of the measured value. If this proposal is authorized by the operator, the data processing and evaluation unit can define the deviating desired value for a setting parameter and/or a deviating measured value similar to an electronic control system.

This is also possible as a reaction to a warning signal or an alarm signal, where an alteration of the desired value for a setting parameter and/or a deviating measured value serves the purpose of returning the production process to a normal state.

On request of the operator, an alteration proposed by the data processing and evaluation unit can also be performed autonomously, that is, without authorization by the operator.

The data processing and evaluation unit's proposal for adapting a desired value for a setting parameter and/or a deviating measured variable can in particular take place in a context-sensitive manner.

Advantageously, in this manner, the data processing and evaluation unit can influence the fingerprint of a production process of an extrusion. Thus, the data processing and evaluation unit can react to alterations of a value of a measured variable, or it can return the production process to a normal state in case a warning or alarm signal is given.

Especially if an autonomous operating state is selected, that is, if a setting parameter desired value and/or a deviating desired value of the measured value are adapted autonomously, the manufacturing costs of an extrusion product can advantageously be lowered and the quality of the extrusion product can be increased simultaneously.

Preferably, the setting parameter desired value and/or a deviating desired value of the measured value are selected using the formulation of the extrusion product.

Some terminology will be explained in the following:

A "formulation" of an extrusion product is the composition of the extrusion product, consisting of the required starting materials.

It is proposed here, among others, that the operator of the production facility and/or the data processing and evaluation unit select a fingerprint using the specific formulation of the extrusion product. In this manner, the production facility and the production process can be adapted to the specific requirements of the extrusion product, which also depend on the formula, by means of the fingerprint.

Some extrusion products can be manufactured with different formulations. It is also possible that the composition of the employed starting materials can be subject to slight variations, which also influences the formulation of the extrusion product. Therefore, it is also specifically proposed here to adapt the fingerprint of the production process depending on the respective formula.

Advantageously, it can be achieved in this manner that the production process and the production facility are optimally adapted to the formulation by means of a fingerprint selected specifically for the formula, which helps to guarantee optimum quality of the extrusion product, even in case of different formulations, and to reduce rejections.

It is explicitly pointed out that the subject matter of the second aspect can advantageously combined with the subject matter of the above aspect of the invention, both individually and cumulatively in any combination.

In a third aspect of the invention, the task is solved by a method for indirectly deriving a systematic dependence, in a production process for an extrusion product, between a measured variable, in particular a process variable, and a setting parameter of the extrusion process and a property of the extrusion product; with an intensity of a property of the extrusion product being determined as a first parameter of the method, a measured variable, in particular the process variable of the production process, being determined as a second parameter of the method by means of a sensor, a third parameter of the method, in particular a parameter of the production facility in production of the extrusion product, especially the setting parameter of the production process, being determined, a data acquisition system digitizing and storing the determined parameters, if desired, the determined parameters being stored in a database in an organized manner, with reference to one another, and the specific dependence between the parameters being systematically derived from the data stored in the database, namely by means of an electronic data processing and evaluation unit which accesses the parameters by means of an algorithm and determines the systematic dependence from them, with the derivation comprising at least two, in particular at least 100, data sets of parameters.

Some terminology will be explained in the following:

A "dependence", in particular a "systematic dependence", describes a dependency relationship of one thing on another. By a variation of one thing, a causal variation of the other can be achieved. A functional dependence in the mathematical sense is not necessary, but possible in this context.

The "quality" of the extrusion product comprises all "properties" of the extrusion product which can be detected by objective and subjective means. In this connection, particularly optical, geometrical and functional properties are distinguished. Concrete properties of extrusion products are in particular mechanical properties, optical properties and haptic properties. The intensity of a property is expressed by a numerical "property value".

An "optical property" is synonymous with an "optically detectable property", that is, a property which can be detected and evaluated by optical means. Examples of properties of film webs which can be quantified optically are gloss, opaqueness, transparency or the pinholes in the extrusion product. In particular, it is pointed out here that optically detectable properties can also comprise subsets of geometrical or functional properties. One example of a geometrical, optically detectable property is the thickness profile of the extrusion product.

A "geometrical property" can be any of the properties of the extrusion product's geometry which can be quantified by a contact or non-contact measurement method. Examples are the thickness profile, the width, the single-layer thickness or the surface roughness of the extrusion product.

A "functional property" is a property of the extrusion product which can be allocated to a function of the film in qualitative o quantitative terms. Examples are breathability or the barrier effect of the extrusion product.

An "intensity" of a property is the intensity or frequency with which the property can be detected. The intensity can be described by a number which is also called "property value".

A "data acquisition system" is used for recording physical measured variables. Depending on the sensor used, it either has an analog digital converter and a measured data storage or data memory. The data acquisition system can record several measured values.

A "data base" is a system for electronic data management. The task of the data base is to store large amounts of data efficiently, unequivocally and permanently and to provide required subsets of the stored data to users and application programs by various methods of representation, depending on the respective purpose.

An "algorithm" is a clear instruction for solving a problem or a class of problems. The algorithm consists of a finite number of single defined steps. They can be implemented in a computer program for execution, but can also be defined in human language. For problem solving, a specific input is translated into a specific output.

The state of the art has provided for the dependencies between a setting parameter and a process variable of the production process and a property of a manufactured extrusion product to be established as empirical values by the operator of the production facility during operation. This means that the operator individually sets the production facility based on the empirical values known to him during initialization, in particular by a startup process. In addition, during ongoing operation the operator corrects any deviations in the properties of an extrusion product based on the empirical values known to him, by intervening on at least one setting parameter.

With increasing complexity of the production facility and rising requirements on the properties of the extrusion product, more and more experience has also been required from an operator of the respective production facility, with corresponding times of operator training and increasing requirements when selecting staff for operation.

Lately it has increasingly been shown that the numerous possibilities of an operator of influencing the properties of an extrusion product more and more exceed his capabilities, also because of increasing complexity and consequent mutual influencing of the different factors. Often the number of influencing variables and the corresponding number of dependencies between a setting parameter and a process variable of the production process on the one hand and a property of the extrusion product on the other hand is so high that the experience required for an operator to be able to operate the production facility is very difficult to gather and frequently exceeds the cognitive capacities of a human being.

As a closely related result, not only have the owners of production facilities for extrusion products needed to increase their efforts for selecting and training operators; but also has the operation of such production facilities become associated with more and more problems, especially if extrusion products with specific properties need to be produced.

In deviation from this, it is proposed here to derive a systematic dependence, in the production process for an extrusion product, between a setting parameter and a process variable of the production process on the one hand and a property of the extrusion product on the other hand, by in-line definition of a property of the extrusion product and storage of a setting parameter and a process variable as parameters of the production facility and the production process in a database, either simultaneously or with time delay, depending on the manufacturing speed needed for the extrusion product, where the property and the parameters are allocated to each other, and by systematic derivation of the specific dependence between the parameters.

This systematic dependence between a setting parameter and a process variable of the production process on the one hand and a property of the extrusion product on the other hand, which is elaborated with the proposed method, summarizes the experience gathered by an operator in a systematic manner.

In a suitable implementation of the method, a systematic dependence is thus derived from data which are recorded during manufacturing of an extrusion product and which are additionally subject to intervention by an experienced operator, based on the empirical values collected by him. In this manner, data are used for deriving the systematic dependence which are based on the experience of one or more experienced users so that the empirical values collected by him (or them) represent a starting point for deriving the systematic dependence.

In a particularly advantageous embodiment, the systematic dependence proposed here can have different influencing variables. A plurality of systematic dependencies with different influencing variables is especially advantageous.

Thus, in a particularly practical variant, it is for instance conceivable to derive a systematic dependence between a single property of an extrusion product and a single setting parameter of the production facility. Such a systematic dependence can be used by the operator or by an automated plant control of a production facility, for instance, for adapting a required property of the extrusion product.

Concretely it is also possible to disregard a process variable. In other words, the systematic dependence would allow taking into account a process variable, but this is not mandatory.

It is also proposed here to derive a systematic dependence between an individual property of an extrusion product, an individual process variable of the production process and an individual setting parameter of the production facility.

A specific dependence with more than one influencing variable for a property of the extrusion product can be used in very different ways. Normally, the property of the extrusion product will be derived, for instance, from one process variable and one setting parameter. It should be pointed out, however, that other interdependences and relationships between the influencing parameters and at least one property of the extrusion product can also be relevant in other methods. Such mappings of the individual parameters with respect to each other and the respective variants of using these specific mappings are also to be taken into account.

An example of using a systematic dependence between an individual property of an extrusion product, an individual process variable of the production process and an individual setting parameter of the production facility would be the following: the operator or an automated plant control of a production facility could regard the process variable (for instance the ambient temperature, the ambient pressure or the air humidity) as the boundary condition of production, and could use the setting parameter, by knowing this boundary condition, to adapt the property of the extrusion product.

There is, however, a plurality of other possibilities of using such a systematic dependence.

An example of a process variable would be the temperature of the extruder cylinder. This temperature may fluctuate, especially during startup of the production facility. It is possible that the temperature of the extruder cylinder may have an influence on the desired property of an extrusion product which cannot be neglected. By means of a systematic dependence between a setting parameter of the production facility, a temperature of the extruder cylinder as a process variable of a production process which fluctuates over time and the property of an extrusion product, the setting parameter of the production facility can be adapted over time to the fluctuating temperature of the extruder cylinder, in a specific case, or generally to the process variable of the production process such that the required property of the extrusion product can be achieved in all conceivable states.

Furthermore, it is proposed to derive a systematic dependence between an individual property of an extrusion product, at least one process variable of the production process and two or more setting parameters of the production facility.

Such a systematic dependence can be used for adapting a property of the extrusion product such that depending on the respective boundary conditions, that is, the process variables(s) of the production process, the optimum combination of setting parameters of the production facility is used.

It is also conceivable that a setting parameter can temporarily not be adjusted. This may result from a technical defect or from another boundary condition. For such cases, it is proposed to use this one setting parameter with its current actual value and to employ the respective systematic dependence with the boundary condition that this single setting parameter is not adjustable. It is true that this will impair the possibilities of achieving optimum properties of the extrusion product, but this impairment will not necessarily be measurable or prevent the extrusion product from complying with the required specifications.

It is common that today's extrusion products must meet more than one requirement concerning properties. Therefore, more than one property must be guaranteed within the framework of the production process.

For this purpose, it is proposed to derive a systematic dependence between two or more properties of an extrusion product, at least one process variable of the production process and two or more setting parameters of the production facility.

This multidimensional systematic dependence will be used for the simultaneous optimization of several properties of an extrusion product while taking all conceivable boundary conditions into account.

In the presently described case, a multicriteria optimization task is to be solved for which the respective optimum setting parameters are to be determined. It is proposed to find respective algorithms for solving multicriteria problems in order to determine the optimum values for the setting parameters. Such algorithms can be, in particular, GDE3, NSGA-II or similar methods.

In this context, it is concretely proposed to evaluate Pareto fronts between the single influencing values and use for instance the insight gain, how the single influencing values condition one another.

If there is a large number of setting parameters of a production facility, there may temporarily not be a sufficient number of available data for deriving a systematic dependence, or there may be so many interdependences between the influencing parameters that the coefficient of determination of the systematic dependence is less than 0.96. For these cases, it is specifically proposed here that for the present data, a plurality of systematic dependences with different influencing parameters is derived. With this plurality of systematic dependences, a maximum number of possible combinations can be achieved.

For selecting the systematic property which is aimed at, at least temporarily, it is proposed to select the systematic dependence which on the one hand meets the requirements necessary for producing the specific extrusion product and which, on the other hand, has the highest coefficient of determination in the set of systematic dependences which are possible according to the first criterion.

Naturally, this aspect of selecting a systematic dependence can also be advantageously used in other situations according to the coefficient of determination of the systematic dependence.

An essential feature of the invention is the organized storage of data, with their reference to one another, consisting of a property of an extrusion product, at least one parameter of the production facility and selectively, as a process variable, one or more parameters of the process of production of the extrusion product. It is of special importance to store the data with time synchronization or, depending on the speed of manufacturing the extrusion product, with time delay. In a particularly advantageous embodiment, the data to be stored are determined in-line.

It is understood that a systematic dependence is not necessarily intended to mean a dependence between two or three parameters. This may well be the case; however, with increasing complexity of the production facility and the extrusion products, multidimensional systematic dependences with a plurality of related variables become increasingly common.

Advantageously, it can be achieved by the aspect of the invention introduced here that for a production process for an extrusion product, a systematic dependence between a setting parameter and a process variable of the production process and a property of the manufactured extrusion product can be derived. This takes place during the manufacturing of an extrusion product and optionally also during the intervention by an operator on the basis of his experience. In this way, the experiences of operators become part of a systematic dependence which extends to the relevant areas due to the empirical values collected by the operators. Thus, also the various experiences of more than one operator can be agglomerated in a systematic dependence.

Another advantage results from the fact that the systematic dependence is continuously refined during manufacture of an extrusion product. Advantageously, in this manner, the systematic dependence can also be extended to aspects of the operation which are rarely achieved but essential for intervention by an operator.

In an advantageous embodiment of the method, continuous refinement of the systematic dependence results in a possibility of testing the robustness of the systematic dependence. In this way, it can be determined in a quantifiable manner whether the systematic dependence is a regularity or a tendency with certain probabilities to be determined by continuous refinement. In addition, the degree and probability of the intensity of a setting parameter, and optionally of a process variable, can be quantified with regard to an individual property of an extrusion product.

Another systematic advantage results from the fact that the data can be stored with reference to one another. In a suitable implementation of the method, care is taken that time synchronization of the data takes place in such a way that an alteration of a setting parameter and the resulting effect on the optical property of an extrusion product can be mapped as precisely as possible. Another essential parameter of the production facility from manufacturing of the extrusion product is the speed of production of the extrusion product, whose recording allows storage of the data, possible acquired in-line, with reference to one another and with a view to alteration of a setting parameter and/or a process variable and the resulting effect on the property of an extrusion product.

Whereas an operator of a production facility tends to react emotionally, especially in critical situations, the systematic dependence, derived according to this aspect of the invention, between a setting parameter of the production facility, a process variable of the production process and a property of the manufactured extrusion product provides an objective description of the facts.

Advantageously, the method described here also provides for the possibility of storing an almost unlimited plurality of parameters and using them for deriving a systematic dependence. The cognitive capabilities of an operator of such a production facility are naturally limited. In particular, due to the ever increasing complexity of such production facilities and due to the increasing number of properties of an extrusion product to be achieved, an operator nowadays often reaches the limits of his capacity. Additionally, with suitable implementation of the method, a plurality of various experiences, including experiences made by different operators, are collected, agglomerated, recorded and used for deriving a systematic dependence between a setting parameter of the production process and a property of the manufactured extrusion product.

Thus, with a suitable implementation of the proposed method, complex relationships between the parameters of the method can be mapped. This applies in particular to dependences with a plurality of related variables which can exhibit various dependences with strong correlations and Pareto fronts of the influencing variables.

Preferably, an intensity of a property of the extrusion product is determined in-line.

Some terminology will be explained in the following:

"In-line" is intended to mean that the property of the extrusion product is determined during the ongoing production process. For instance, a property of the product can be determined in-line by having a sensor determine a property of the material flow of the extrusion product, which flow passes by the sensor.

Thus, it is proposed that the intensity of a property of the extrusion product during ongoing production, with the production facility operating, can be determined directly on the product which is undamaged by measurement, for instance by means of a suitable sensor.

Advantageously, it can be achieved in this manner that the intensity of a property is measured directly, quickly and in time synchronization with other values, in particular of a setting parameter and/or a process variable. In this manner, the data of the different parameters can be quickly determined and directly stored in the data processing and evaluation unit.

In particular, in-line determination of a property of an extrusion product advantageously allows for a large number of individual data points. In addition, it helps to detect the response of a property of an extrusion product to minor changes in the setting parameters in a relatively simple manner.

Since in-line determination of a property of an extrusion product entails practically no time lag for determining the intensity of the property, it is advantageously possible to evaluate the property very quickly.

In-line determination of the intensity of an extrusion product's property advantageously allows deriving a systematic dependence between the individual parameters in a relatively short time.

Also, it is advantageously achieved that the extrusion product does not need to be damaged in a continuous production process for taking e. g. a sample in order to determine the intensity of a property in a laboratory.

Optionally, the intensity of a property of the extrusion product can be determined offline.

Some terminology will be explained in the following:

"Offline" is intended to mean that the property of the extrusion product is not determined during ongoing production of the extrusion product. For instance, a property of the product can be determined offline by taking a sample of the product and determining a property of the same using this sample. For example, the sample can be examined in a laboratory with determination of one or more properties of the extrusion product.

Thus, it is proposed that the intensity of an extrusion product's property be not determined in a continuous production process, but by means of a material sample of the extrusion product in a laboratory.

In this context, it is conceivable, among others, that the intensities of a property of an extrusion product, which have been determined in the lab, are synchronized with the actual values of the production facility's setting parameters and with the actual values of the production process' process variables, via a data interface, in the data acquisition and evaluation unit of the production facility. Synchronization is done by precisely allocating the data on the intensity of an extrusion product's property, which were acquired in the laboratory, to the values of the production facility's setting parameters and the production process' process variables which had been set at the time at which the respective material sample of the extrusion product was produced.

The data interface can be located directly in the laboratory so that the data can be input manually or automatically via the data interface, or they can be input manually at the production facility or automatically via an adapted interface at the data acquisition and evaluation unit.

It is also proposed, among others, to check the data for plausibility after they have been input, using the known systematic dependence between the determined parameters. If a data point which has been determined and input deviates by twice the amount to be expected according to the respective coefficient of determination, it is proposed to manually check and acknowledge the data point because of its effects on systematic dependence.

It is furthermore proposed, among others, that the operator should mark, at the end of his shift, incomplete data points for repeated checking during his next shift. If the data point cannot be completed in spite of repeated checking and passing of three times the time period which is expected for determining the intensity of a property of the extrusion product, it is specifically proposed that the operator can decide whether to delete the data point or plan to check it again.

The degree of lab automation proposed here can range from the simple input screen form to the digital connection of laboratory equipment to the data acquisition system of the plant.

Advantageously, it can be achieved in this manner that the intensity of a property of the extrusion product can be determined with more precision than is possible in-line at the production facility.

In this way, and by means of the plausibility check of the data points, it can advantageously be achieved, among others, that the errors in the available data are reduced.

It can also be advantageously achieved in this manner that due to the higher data quality, the systematic dependence between the determined parameters leads to a higher prediction quality of the systematic dependence.

On the whole, it can thus also be achieved that the effort necessary for establishing a systematic dependence with a high coefficient of determination can be substantially reduced.

Preferably, the systematic dependence of the parameters is determined in the form of a curve with a coefficient of determination.

Some terminology will be explained in the following:

The parameters in this context can be specifically, among others, at least one intensity of a property of an extrusion product, at least one setting parameter of the production facility and optionally also at least one process variable of the production process. As a rule, the parameters will specifically be at least one intensity of a property of an extrusion product, at least one setting parameter of the production facility and at least one process variable of the production process.

Thus, it is proposed here, among others, that a property of an extrusion product is determined in dependence on a setting parameter of the production facility or in dependence on a process variable of the production process or in dependence on a setting parameter of the production facility and in dependence on an process variable of the production process.

A "coefficient of determination" is a quality criterion indicating the percentage of variance in the data which can be explained by means of a regression model. Indirectly, it also helps to determine the relationship between the dependent and independent variables.

Advantageously, in this manner, the systematic dependence can be indicated by a curve in dependence on a setting parameter of the production facility and/or a process variable of the production process; in particular, this curve has no gaps so that a setting parameter or a process variable can be directly assigned to a property of the extrusion product. For dependence on a setting parameter and a process variable, it is specifically proposed here, among others, that the systematic dependence be indicated, for instance, by a set of curves.

The evaluation of a coefficient of determination of the determined data, and of the curve plotted by means of a regression model, provides an indication of the precision of the systematic relationship between a setting parameter of the production process and an optical property of the extruded film web; provided that there is a sufficient number of data points. Advantageously, this helps to evaluate the validity of a correlation between a setting parameter of the production process and an optical property, and to give an indication of how well available data can be reproduced. In addition, in case of a large coefficient of determination, the curve also provides information on the boundaries of available data. This allows numerical supplementation of data and/or extrapolation on the boundaries of existing data.

Optionally, the systematic dependence of the parameters is determined by a setting range depending on the normal range and/or the warning range and/or the alarm range for a property of the extrusion product.

Some terminology will be explained in the following:

A "setting range" is a range within which a setting parameter can be adjusted. In other words, it is the range of the setting parameter between a minimum setting parameter desired value and a maximum setting parameter desired value.

Advantageously, this helps to achieve two things either independently or in combination.

On the one hand, a specific relationship between a setting parameter of the production facility, a process variable of the production process and a property of the extrusion product in dependence on a setting range prevents the existence of non-applicable dependences, that is, statements about non-adjustable values of a setting parameter are not possible.

On the other hand, a setting range which is dependent on a predefined threshold value for a property of the extrusion product allows, due to the systematic relationship between a setting parameter of the production facility, a process variable of the production process and a property of the manufactured extrusion product, only statements about setting ranges to be made which are dependent on a predefined threshold value for the property of the extrusion product.

Preferably, the systematic dependence is represented in the form of an envelope curve which shows the dependence on the normal range and/or the warning range and/or the alarm range for the property of the extrusion product.

Some terminology will be explained in the following:

An "envelope curve" is a closed curve enclosing an area. The area can be limited by an isoline describing, for instance the borderline between the normal range and the warning range or between the warning range and the alarm range or the exterior line of the alarm range. It is also specifically conceivable, among others, that the envelope curve limits an operating range of a production facility.

Advantageously, it can be achieved in this manner that especially systematic dependences with more than two input variables, in particular setting parameters and/or process variables, can be evaluated, represented and used in an organized manner.

Also, the limits of an envelope curve can advantageously be defined in dependence on technical restrictions and/or specific application profiles, extending the advantages of threshold values for systematic dependences between two parameters to systematic dependences with more than two parameters.

Optionally, the systematic dependence between the parameters can be described heuristically.

Thus, it is proposed here, among others, to arrive at probable conclusions or practical solutions in spite of a limited knowledge of the systematic dependence and in spite of a limited number of data points of the individual parameters and limited time. To do this, an analytical procedure helps to draw conclusions about a systematic dependence of the parameters.

Advantageously, in this manner, a practical systematic dependence can be determined even in case of a limited number of data or data gaps, or with a limited amount of time.

Preferably, the systematic dependence between the parameters can be determined mathematically.

Thus, it is proposed here, among others, to determine the systematic dependence by means of a mathematical rule.

Advantageously, in this manner, the science of mathematics can be applied such that a systematic dependence is derived which is as unique as possible in the mathematical sense.

Optionally, the systematic dependence between the parameters can be determined by means of an optimization method.

In a suitable and advantageous implementation of this method, optimization methods are used for minimizing the uncertainties of systematic dependences; in other words, the coefficients of determination of systematic dependences are maximized. Thus, the description of a systematic dependence is rendered more precise.

In doing so, for multicriteria problems, it is proposed, among others, to also use optimization methods which are suitable for multicriteria optimization. In particular, these could be methods of generalized differential evolution or methods based on neural networks.

Thus, in an advantageous implementation of the method, an optimization method can be used for detecting, analyzing and describing multidimensional dependences between parameters.

Advantageously, it can be achieved in this manner that the use of optimization methods leads to more refined systematic dependences and that complex relationships between the data can be better identified and made use of.

In particular, it can advantageously be achieved that systematic dependences can also be derived in case of multicriteria targets.

Preferably, the systematic dependence between the parameters is determined by means of a self-learning optimization method.

Some terminology will be explained in the following:

A "self-learning optimization method" is a class of algorithms which can also be grouped under "machine learning". Such an algorithm is characterized by the fact that it can learn from examples and generalize the knowledge it has acquired. Thus, such an algorithm generates knowledge from experience.

Thus, it is proposed, among others, to use an algorithm which has the features of an algorithm from the class of machine learning. The algorithm is able to derive a systematic dependence between the parameters from some empirical values collected by the operator(s) or from empirical values acquired by an operator in combination with measured parameters.

Advantageously, it can be achieved in this manner that due to the use of self-learning optimization methods, the complex tasks do not have to be adapted to new conditions by the operator. This helps to save time and money when systematic dependences are derived. In particular, with the method proposed here, it is advantageously possible to add a new influencing variable to an existing systematic dependence. In this way, the know-how of existing production facilities can be more easily adapted to more complex production facilities or facilities with new setting parameters or process variables.

It is explicitly pointed out that the subject matter of the third aspect can advantageously be combined with the subject matter of the above aspects of the invention, both individually and cumulatively in any combination.

In a fourth aspect of the invention, the task is solved by a method for adapting the quality of an extrusion product manufactured with a production facility, where the quality is determined and adapted in-line, an intensity of a property of the extrusion product is determined, a measured variable, in particular a process variable, of the production process is determined by means of a sensor and a setting parameter desired value is adapted in-line by means of the specific property and the measured variable, in particular the process variable; with adaptation of the setting parameter taking place by means of an actuator; the setting parameter desired value being described by a systematic dependence for a defined intensity of the property and for the measured variable, in particular the process variable; the dependence being defined by a method according to the third aspect of the invention and the quality of the extrusion product being changed by adaptation of the setting parameter in such a way that the intensity of a desired property is increased and/or the intensity of an undesired property is decreased.

Some terminology will be explained in the following:

An "actuator" is specifically adapted for influencing an output value of a system.

A "threshold value" is a minimum or maximum intensity of a property of an extrusion product.

A "control" is an adjustment of a setting parameter.

A "closed-loop control" involves the continuous measurement of a measured variable and the control of a system in dependence on a default value for the measured variable. The measured value and the default value are continuously compared.

To date, the state of the art has provided for an operator of a production facility for manufacturing an extrusion product to define the quality of the extrusion product by adjusting a setting parameter according to empirical values collected by him. If the operator detects any deviations in quality during the manufacturing of an extrusion product, he uses those empirical values and adjusts a setting parameter such that the desired quality of the extrusion product results. This process is often iterated until the desired quality of the product is achieved. In case of any repeated deviations in quality, the operator iterates this process. This state of the art can also be termed "operator control" of a production facility for manufacturing an extrusion product.

In the state of the art, the operator of a production facility for manufacturing an extrusion product often monitors a property of the product directly or indirectly in-line with his eyes. Functional quality features of an extrusion product which cannot be monitored with one's eyes are not determined in-line in the state of the art. Instead, a material sample of the extrusion product is taken during production and analyzed offline, generally in a laboratory.

In deviation from this, it is proposed here to make use of the systematic dependence established according to the third aspect of the invention in order to adapt the quality of the extrusion product.

For this purpose, a property of the extrusion product is determined, for instance by means of a sensor, and the systematic dependence established according to the third aspect of the invention is used in such a way for adapting the quality of the film web that the setting parameter value for manufacturing the extrusion product, which is required for achieving the desired product quality, is derived from the systematic dependence.

For this purpose, it is specifically proposed here, among others, that a dependence on an actual value of a process variable of the production process is taken into account as well.

With the aspect of the invention introduced here, it can advantageously be achieved that the operator of a production facility for manufacturing an extrusion product needs a lesser degree of individual experience. Thus, the selection of qualified operators for the production facility for manufacturing an extrusion product can be facilitated.

In addition, the necessary training units for the operators can advantageously focus less on the transfer of collected empirical values and can therefore be drastically shortened, since for adapting the quality of the extrusion product, the operator of the production facility can make use of a systematic dependence.

Furthermore, the use of a systematic dependence for adapting the quality of an extrusion product can advantageously reduce the emotional component in performing alterations of the setting parameter values of the production facility, consequently also reducing the human factor in susceptibility to errors during the quality control process. This increases the probability of success and the sustainability of quality control, even in case of an increased workload for the operator of the production facility.

In addition, the normally iterative process of adapting the quality of the extrusion product during manufacturing can advantageously be accelerated; especially since adaptation does not have to be iterative anymore, so that the share of extrusion products which meets highest quality demands can increase. Rejections of manufactured extrusion products can thus be reduced.

Advantageously, in this manner, in adaptation of the quality of the extrusion product the process variables forming boundary conditions of the production process can also be taken into account, further raising the quality of the extrusion product.

Furthermore, with the proposed method, adaptation of the quality of the extrusion product can be automated even under unfavourable conditions.

Preferably, the intensity of a property of the extrusion product is determined in-line.

Thus, it is specifically proposed here that an intensity of a property of the extrusion product does not have to be determined in a laboratory, but instead the determination takes place in-line in the production facility during manufacturing.

Advantageously, it can be achieved in this manner that by measuring the intensity of an extrusion product's property in-line, adaptation of the quality of an extrusion product can also take place in-line since the intensity of the property is directly available in the data acquisition and evaluation unit after measurement and can therefore be used directly and without longer delay times for adapting the quality.

Optionally, the intensity of a property of the extrusion product can be determined offline.

Advantageously, in this manner, the intensity of the property of the extrusion product can be determined with higher precision and thus adaptation of the quality of the property of the extrusion product can also take place with higher precision.

Preferably, the quality of the extrusion product has a geometrical property.

Examples of a geometrical property of an extrusion product can be its dimensions or its surface structure.

Advantageously, in this manner, the quality of the extrusion product can be improved also in terms of its geometrical properties, if there is a direct and/or indirect systematic relationship between a geometrical property of the extrusion product and a setting parameter of the production facility.

Consequently, the quality of an extrusion product can also be tested in-line in an automated manner in terms of its geometrical properties, and in case of deviations in a geometrical property, the operator can be alarmed or informed in order to be able to perform an adaptation of a setting parameter of the production facility.

In addition, the operator can advantageously use the systematic dependence between a setting parameter of the production facility for the extrusion product and a geometrical property to perform a quick and robust adaptation of the film web's quality in terms of a geometrical property of the extrusion product.

In this manner, a higher degree of quality of the extrusion product can be ensured also in terms of its geometrical properties, and the amount of rejections in manufacturing the extrusion product can advantageously be reduced.

Also, advantageously a geometrical property of the extrusion product can be documented during manufacturing and this documentation can be made available to the customer who acquires the extrusion product. This can help to strengthen customer confidence in the product.

Also, a general documentation of the product properties can be used for certification of the extrusion product, advantageously increasing the value of the manufactured extrusion product.

A geometrical property of an extrusion product can advantageously adhere to default settings if there is a direct and/or indirect systematic dependence between a setting parameter of the production facility and a geometrical property of the product.

Optionally, the quality of the extrusion product can have an optical property.

Examples of optical properties of an extrusion product are transparency of the product, optical density of the product, reflectivity or transmittance of an extrusion product.

Advantageously, in this manner, it can be achieved that the quality of the extrusion product can also be adapted in terms of its optical properties.

In this way, a higher degree of quality can be ensured for the product, also in terms of its optical properties, and the amount of rejections in manufacturing the product can be advantageously reduced.

Also, advantageously an optical property of the extrusion product can be documented during manufacturing and this documentation can be made available to the customer who acquires the extrusion product. This can help to strengthen customer confidence in the product.

Preferably, the quality of the extrusion product has a functional property.

Examples of functional properties of an extrusion product are water vapor permeability of a film web, breathability of a film web, the barrier characteristics, the stretching rate or the flatness of a film web.

Advantageously, in this manner, it can be achieved that the quality of the extrusion product can be adapted also in terms of its functional properties.

In this way, a higher degree of quality can be ensured for the product, also in terms of its functional properties, and the amount of rejections in manufacturing the product can be advantageously reduced.

Also, advantageously a functional property of the extrusion product can be documented during manufacturing and this documentation can be made available to the customer who acquires the extrusion product. This can help to strengthen customer confidence in the product.

Optionally, the quality of the extrusion product can be adapted in-line and fulfills the desired quality requirements, that is, there is no measurable disturbance.

Some terminology will be explained in the following:

A "disturbance" is a parameter which deviates from its specified condition.

Here, it is specifically proposed, among others, that the quality of a film web be adapted in-line in an automated manner such that there is no longer any measurable disturbance. A quality adaptation of this kind would in particular mean that any measured deviations in quality would be eliminated immediately in an automated manner until no disturbance would be measurable anymore.

In this manner, the quality of an extrusion product is controlled within the quality limits defined by precision of measurement.

Advantageously, it can be achieved in this way that quality requirements on an extrusion product can be maintained in-line in an automated manner.

This can help to drastically reduce rejections of manufactured extrusion products.

Advantageously, it can also be achieved that by automated control of the quality properties of the extrusion product, workload can be taken from an operator of the production facility for manufacturing an extrusion product. The operator can focus more on other process requirements. Consequently, a lesser level of training in terms of quality monitoring and quality control will be required from the operators of the production facility.

Preferably, the desired quality of the extrusion product is defined manually.

It is concretely proposed here, among others, that the operator of a production facility can manually define the fingerprint with all setting parameters for production of an extrusion product contained therein.

In a particularly adapted embodiment of this feature, an operator can manually set the desired quality requirements on an extrusion product. For this purpose, he can use the fingerprint of the product. In this way, a quick manual reaction to an alteration of the desired quality properties of an extrusion product becomes possible, and the product can easily be adapted to the desires of a different customer and/or to a different purpose of use, provided that the necessary fingerprints are available.

Advantageously, in this manner, an operator of a production facility for manufacturing an extrusion product can easily, quickly and manually adapt the desired quality of the product by means of the respective fingerprint.

Optionally, the desired quality of the extrusion product can be predefined automatically.

Thus, in a suitable embodiment, it is possible, by means of the respective fingerprints, to distinguish between various extrusion products to be manufactured which are stored in the data acquisition and evaluation unit, where the higher-level production control can perform adaptations in terms of the desired quality requirements in an automated manner, such that a change between the different extrusion products which can be manufactured in one production facility can be performed very quickly.

Also, it is concretely proposed here, among others, that a change between two extrusion products with different requirements on the intensities of the properties of the products can be performed during ongoing operation. For this purpose, it is proposed that a label be applied on the continuously manufactured extrusion product as soon as the change of product is started and a second label be applied as soon as the product change has been completed.

By means of the labels, the individual extrusion products can be separated from the rejections.

Advantageously, in this manner, a quick and easy product change between two extrusion products is possible, where the production facility does not have to be shut down or started for the change of products. In particular, an extruder, as a component of a production facility for extrusion products, can in this way be flushed during operation. A flushing of the extruder is necessary especially if the formulation is changed, which is quite frequently the case when a change of extrusion products takes place. Normally, an extruder is manually disassembled and cleaned during flushing. This time effort can be substantially reduced with the method proposed here.

Also, it can advantageously be achieved in this manner that the probability of incompatible quality requirements is reduced. Thus, it can be ensured that different quality requirements for a film web are matched with each other and correspond to product requirements.

Preferably, more than one measured variable are defined in-line as parameters of the method by means of one or more sensors on the manufactured extrusion product and/or at the production facility.

In an embodiment proposed here, a property of the extrusion product or a process variable of the production process is determined at different positions in the production process by means of a first and a second sensor. In a particular simple case, such a property can be the temperature of the plastic.

In another suitable embodiment, different measurement methods can be employed at a position in the production process.

Advantageously, in this manner, the use of additional sensors can help to determine additional parameters of the production facility and/or the production process which may be used to derive a systematic dependence.

Furthermore, it can advantageously be achieved that quality requirements can be monitored in different positions of the production process.

Optionally, the setting parameter desired value in the production process for the extrusion product for influencing the quality of the product is determined by means of a specific suitable algorithm.

Advantageously, in this way, the quality of an extrusion product can be adapted in an automated manner by means of a specific suitable algorithm. Thus, it can be ensured that the quality of an extrusion product is adapted in an automated manner with high frequency. Furthermore, errors in adapting the quality of an extrusion product can be avoided, especially errors caused by human behaviour. With an adaptation of an extrusion product's quality in the manner that is proposed here, the only errors that may possibly occur are systematic errors which, however, can be remedied by adaptation of the specific algorithm.

Preferably, in the production process of the extrusion product, the setting parameter desired value for influencing the quality of the extrusion product is determined by means of a suitable specific algorithm which uses an in-line system deviation, that is, the difference between the desired quality of the extrusion product and the determined quality of the product, as the input value.

Some terminology will be explained in the following:

A "control deviation" is intended to mean the difference between the desired value and the actual value of a variable, in particular the quality of the extrusion product.

In a suitable embodiment, a closed control loop can thus be used for adapting the quality of an extrusion product. By using a control deviation, a disturbance variable can be set to zero, after a transient recovery time of the specific algorithm used for controlling the quality deviation.

Advantageously, in this manner, determined disturbance variables can be eliminated in an automated manner by a loop controller. Thus, highest requirements on product quality can be met in a guaranteed manner.

Optionally, the setting parameter desired value is determined by means of an optimization method in the production process for the extrusion product for influencing the quality of the extrusion product.

Advantageously, in this manner, it can be achieved that a predefined setting parameter desired value can react to deviating boundary conditions; in particular, a predefined setting parameter desired value can be adapted to variable process variables of the production process.

Preferably, the setting parameter desired value is determined with a self-learning optimization method in the production process of the extrusion product for influencing the quality of the extrusion product.

Thus, it is concretely proposed here, among others, to use an algorithm for determining a setting parameter desired value which has the features of an algorithm from the class of machine learning. Thus, the algorithm is able to derive a systematic dependence between the parameters from some empirical values collected by the operator(s) or from empirical values gathered by an operator in combination with measured parameters.

Advantageously, in this manner, it can be achieved that due to the use of self-learning optimization methods, the complex tasks do not have to be adapted by the operator to new conditions, e. g. to variable process values of the production process. This helps to save time and money in deriving systematic control algorithms. In particular, with the method proposed here, it is advantageously possible to add a new influencing variable to an existing systematic dependence. Thus, the knowledge of existing production facilities can be adapted more easily to more complex production facilities with new setting parameters or process variables.

In a particularly advantageous embodiment, the setting parameter actual value and/or the measured value and/or a property value and/or a setting parameter desired value and/or a desired value of the measured value and/or a desired property and/or a normal range, in particular the range of a setting parameter desired value and/or the range of a desired value of the measured value and/or of a property desired value, and/or a warning range, in particular the range of a setting parameter desired value and/or the range of a desired value of the measured value and/or of a property desired value, and/or an alarm range, in particular the range of a setting parameter desired value and/or the range of a desired value of the measured value and/or of a property desired value, are stored in a data processing and evaluation unit and/or in a database.

Advantageously, it can be achieved in this manner that the respective values are available in a database and can be retrieved if desired. In particular, it can be advantageously ensured in this manner that methods using one of these parameters can retrieve it directly from a data processing and evaluation unit and/or a database, making the values for these methods directly usable in an easy manner.

Furthermore, it advantageously ensues that the values can be easily adapted if they are stored in a data processing and evaluation unit and/or in a database.

Preferably, the setting parameter actual value and/or the measured value and/or a property value and/or a setting parameter desired value and/or a desired value of the measured value and/or a desired property and/or a normal range, in particular the range of a setting parameter desired value and/or the range of a desired value of the measured value and/or of a property desired value, and/or a warning range, in particular the range of a setting parameter desired value and/or the range of a desired value of the measured value and/or of a property desired value, and/or an alarm range, in particular the range of a setting parameter desired value and/or the range of a desired value of the measured value and/or of a property desired value, are stored in a database, with an existing database being continuously enlarged.

Advantageously, it can be achieved in this manner that the record of these data can be stored in a continuously enlarged database. This record can be used, on the one hand, for documentation purposes, in particular for documentation of the quality record of an extrusion product, and, on the other hand, for allowing learning processes from the data. These can be learning processes from an analysis by an operator or a plant manufacturer or from an analysis by a self-learning algorithm.

In an advantageous embodiment of the invention, this aspect also makes available a larger plurality of data which can be used for deriving a systematic dependence. Thus, it can advantageously be achieved that the systematic dependence according to the third aspect of the invention can achieve a higher coefficient of determination.

It is conceivable, among others, that due to the larger plurality of data, the systematic dependence can be extended to a larger range of parameters, where advantageously a regionally higher coefficient of determination of the systematic dependence is achieved also in the boundary areas.

Furthermore, in this manner, advantageously the coefficient of determination of the data can be continuously improved and/or further dependences, in particular dependences between parameters with weak correlation, can be securely identified and described.

Optionally, the setting parameter actual value and/or the measured value and/or a property value and/or a setting parameter desired value and/or a desired value of the measured value and/or a desired property and/or a normal range, in particular the range of a setting parameter desired value and/or the range of a desired value of the measured value and/or of a property desired value, and/or a warning range, in particular the range of a setting parameter desired value and/or the range of a desired value of the measured value and/or of a property desired value, and/or an alarm range, in particular the range of a setting parameter desired value and/or the range of a desired value of the measured value and/or of a property desired value, are stored in a database which only contains data of a specific production facility for producing one extrusion product.

It is therefore proposed here, among others, to only use data from one specific production facility and no data from different production facilities and/or data from production facilities for extrusion products which are operated under different boundary conditions.

Advantageously, it can be achieved in this manner that the acquired data, which are used, among others, for deriving a systematic dependence according to the third aspect of the invention, are not contaminated and/or diluted and/or smeared. In other words, it can be advantageously ensured in this manner that the acquired data are consistent and/or logical. Thus, advantageously an optimum coefficient of determination and/or an optimum correlation between the parameters can be achieved in the data.

Preferably, the setting parameter actual value and/or the measured value and/or a property value and/or a setting parameter desired value and/or a desired value of the measured value and/or a desired property and/or a normal range, in particular the range of a setting parameter desired value and/or the range of a desired value of the measured value and/or of a property desired value, and/or a warning range, in particular the range of a setting parameter desired value and/or the range of a desired value of the measured value and/or of a property desired value, and/or an alarm range, in particular the range of a setting parameter desired value and/or the range of a desired value of the measured value and/or of a property desired value, are stored in a database containing data from a plurality of production facilities for producing the same type of extrusion product.

Advantageously, in this manner, the data available for evaluation and for deriving a systematic dependence according to the third aspect of the invention can be quickly condensed in this manner, since only data from production facilities of the same kind are taken into account so that dependences caused by similarities can be excluded.

Optionally, the setting parameter actual value and/or the measured value and/or a property value and/or a setting parameter desired value and/or a desired value of the measured value and/or a desired property and/or a normal range, in particular the range of a setting parameter desired value and/or the range of a desired value of the measured value and/or of a property desired value, and/or a warning range, in particular the range of a setting parameter desired value and/or the range of a desired value of the measured value and/or of a property desired value, and/or an alarm range, in particular the range of a setting parameter desired value and/or the range of a desired value of the measured value and/or of a property desired value, are stored in a database containing data from a plurality of production facilities or producing an extrusion product of a different kind.

Advantageously, in this manner, the data available for evaluation and for deriving a systematic dependence according to the third aspect of the invention can quickly be multiplied and/or condensed in this manner.

Preferably, the setting parameter actual value and/or the measured value and/or a property value and/or a setting parameter desired value and/or a desired value of the measured value and/or a desired property and/or a normal range, in particular the range of a setting parameter desired value and/or the range of a desired value of the measured value and/or of a property desired value, and/or a warning range, in particular the range of a setting parameter desired value and/or the range of a desired value of the measured value and/or of a property desired value, and/or an alarm range, in particular the range of a setting parameter desired value and/or the range of a desired value of the measured value and/or of a property desired value, are stored in a database containing the data of production facilities for producing an extrusion product of one or of many manufacturers.

Advantageously, in this manner, the data available for evaluation and for deriving a systematic dependence according to the third aspect of the invention can quickly be multiplied and/or condensed.

Preferably, the setting parameter actual value and/or the measured value and/or a property value and/or a setting parameter desired value and/or a desired value of the measured value and/or a desired property and/or a normal range, in particular the range of a setting parameter desired value and/or the range of a desired value of the measured value and/or of a property desired value, and/or a warning range, in particular the range of a setting parameter desired value and/or the range of a desired value of the measured value and/or of a property desired value, and/or an alarm range, in particular the range of a setting parameter desired value and/or the range of a desired value of the measured value and/or of a property desired value, are stored in a database containing the data of production facilities for producing an extrusion product of one or of many producers.

Advantageously, in this manner, the data available for evaluation and for deriving a systematic dependence according to the third aspect of the invention can quickly be multiplied and/or condensed, where selectively only the data of one producer or of several producers of an extrusion product can be taken into account.

Also, it can advantageously be achieved that in this manner, the empirical values collected by a plurality of operators, or of different producers, and/or fingerprints of different production processes can be agglomerated on different sites, also supporting machine learning according to the third and/or the fourth aspect of the invention.

Optionally, the setting parameter actual value and/or the measured value and/or a property value and/or a setting parameter desired value and/or a desired value of the measured value and/or a desired property and/or a normal range, in particular the range of a setting parameter desired value and/or the range of a desired value of the measured value and/or of a property desired value, and/or a warning range, in particular the range of a setting parameter desired value and/or the range of a desired value of the measured value and/or of a property desired value, and/or an alarm range, in particular the range of a setting parameter desired value and/or the range of a desired value of the measured value and/or of a property desired value, are stored in a database which synchronizes the data with a site-independent storage.

Some terminology will be explained in the following:

A "site-independent storage" is a data memory not dependent on or associated with a specific site. Instead, a site-independent storage is a memory specifically not associated with a machine or plant, a manufacturing process or a production shed, an enterprise or a state or a value chain.

Advantageously, in this manner, it can be achieved that the data available for evaluation and for deriving a systematic dependence according to the third aspect of the invention can quickly be multiplied and/or condensed, where the possibilities of information technology are used of synchronizing data via a site-independent storage.

This helps to reduce the efforts for data synchronization.

It is explicitly pointed out that the subject matter of the fourth aspect can advantageously be combined with the subject matter of the above aspects of the invention, both individually and cumulatively in any combination.

In a fifth aspect of the invention, the task is solved by a method for starting a production process for an extrusion product with a production facility, with the setting parameter desired value being predefined according to a history of predefined setting parameter desired values in dependence on a production process development parameter.

During stationary or quasi-stationary operation of a production facility for extrusion products, the process variables of a production facility have values which greatly differ from those in a state where the production facility has not been used for approximately one day. For example, the temperature of a component of the production facility, in particular the temperature of the extruder cylinder, is much higher during operation of the production facility than after the production facility has completely cooled down, in particular to room temperature.

The decisive factor in this context is not the time in which the process values of the production facility change, but the fact that during startup of a production facility, the process values of the production facility and/or of the production process change, among others.

This change in process values has effects on production of the extrusion product. Among others, a property of the product can change with an alteration of the process value.

To minimize these effects caused by the alteration of one or more process values, adaptations in the production facility are carried out; in particular, the operator of a production facility for extrusion products adapts one or more setting parameters of the facility and/or one or more process values of the production facility or the production process which can be influenced.

During shutdown of the production facility, alterations of a process value in comparison to the value during stationary or quasi-stationary operation of the production facility take place as well. Consequently, also during shutdown of the production facility, adaptations of one or more setting parameters of the facility and/or one or more process values of the production facility or the production process, which can be influenced, need to be performed so that in an optimum case, a property of the extrusion product is not influenced or only to a minor degree.

The change of a first extrusion product to a second extrusion product is also associated with alterations of a process value so that here as well, alterations of one or more setting parameters of the production facility and/or of one or more process values of the production facility or the production process, which can be influenced, are necessary.

Until today, the state of the art has provided for the operator of a production facility to perform these adaptations manually as a consequence of alterations of the process value during startup or shutdown or with a change of product, depending on his personal experience with the production facility. Because a process value changes continuously till stationary or quasi-stationary production operation or till a standstill of the production facility is reached, a setting parameter and/or a process variable which can be influenced also needs to be adapted continuously in order to achieve optimum properties of the extrusion product.

In deviation from this, it is proposed here that an operator can store the desired values of the existing setting parameters and/or of the process variables which can be influenced, especially in the form of a fingerprint according to the first and/or the second aspect of the invention.

In particular, it is proposed here that for an adaptation, only the desired value of a setting parameter or the desired value of a process variable which can be influenced is adapted and then stored by the operator.

It is specifically proposed here, among others, that the operator stores the data during startup, during product change and/or during shutdown in discrete steps, where these discrete steps are stored in dependence on a production process development parameter.

If this procedure is observed from the perspective of the workflow description, it can also be said that storing of the desired values of the available setting parameters and/or the desired values of the process variables which can be influenced, in particular in the form of a fingerprint according to the first and/or the second aspect of the invention, in dependence on a production process development parameter represents a teach-in of prominent waypoints during the process leading from a production facility at a standstill to a stationary or quasi-stationary operation of the production facility, or during the process leading from a first extrusion product to a stationary or quasi-stationary production of a second extrusion product or during the process leading from a stationary or quasi-stationary operation of the production facility to a production facility at a standstill.

It is proposed, among others, that the waypoints can be stored and managed in dependence on a production process development parameter of these different processes, in particular a starting process, a shutdown process or a product change, for different extrusion products; and also that different values of process variables which cannot be influenced can be stored and managed side by side.

It is also proposed, among others, that an operator can record a way consisting of waypoints by means of an automated recording function. Thus, it is conceivable, for instance, that before a startup process, a change of product or a shutdown process, an operator triggers a recording function which records the changes performed by him in the form of waypoints in dependence on a production process development parameter. In other words, the experiences made by an experienced staff member can be recorded in this manner.

Specifically, it is proposed here, among others, that ways for other situations not mentioned here yet, in which an operator performs a procedure of changes—these can in particular be problem situations—, are recorded, managed and can later be used by other operators as well.

On the basis of these ways learned by means of waypoints, from changes of the values of the production facility and/or the production process in dependence on a production process development parameter, it is specifically proposed here, among others, that the ways which have been learned can be used for new startup processes and/or shutdown processes and/or product changes, such that the operator is either guided manually from one change to the next or the changes are tracked automatically by the production facility after a starting signal has been given by the operator.

Thus, the operator can be guided from one step to the next in a context-sensitive manner.

In this manner, it can advantageously be achieved that the different ways described by waypoints are managed, loaded and made use of for starting or shutting down a production facility or for a change of product.

In particular, it is thus also advantageously conceivable, for instance, that even an inexperienced operator can operate a production facility with the ways which have been stored, especially stored by an experienced operator.

Advantageously, it can be achieved in this manner that an operator of a production facility is supported and/or relieved of workload since he can use the ways which have been stored in an automated or manual manner, depending on the situation. Thus, the cycles between two extrusion products can advantageously be shortened, which on the whole increases productivity and reduces rejections.

Also, advantageously the performance and/or experience of the best and/or most experienced operator can be made available at any time and his method of proceeding can be copied and/or used by other operators.

By means of discrete waypoints, advantageously a way can be divided into partial steps, which is a clear improvement over a method with continuous alterations of individual setting parameters.

Furthermore, it can advantageously be achieved that a change of product can be performed automatically or semi-automatically.

By means of the stored ways, in particular the ways for starting a production facility, the best way in energetic terms can be selected so that operational costs of the production facility can be saved and manufacturing costs of the extrusion product can be lowered.

It is further proposed that by means of the ways which have been stored an energy guidance can be provided by the manufacturer of the production facility or by a service provider, which also helps to lower the costs of manufacturing an extrusion product.

Preferably, a setting parameter desired value is defined by a method according to the fourth aspect of the invention.

It is understood that the advantages of a method for adapting the quality of an extrusion product manufactured with a production facility, the quality being determined and adapted in-line, according to a fourth aspect of the invention, as described above, directly extend to a method of starting a production process for an extrusion product by means of a production facility, where the setting parameter desired value is predefined according to a history of predefined setting parameter desired values in dependence on a production process development parameter.

It is explicitly pointed out that the subject matter of the fifth aspect can advantageously be combined with the subject matter of the above aspects of the invention, both individually and cumulatively in any combination.

In a sixth aspect of the invention, the task is solved by a method for manufacturing an extrusion product, with an extruder being operated for plastification of a thermoplastic material, wherein during manufacturing a method according to the first and/or the second and/or the third and/or the fourth and/or fifth aspect of the invention is performed.

It is understood that the advantages of a method for monitoring a production process for an extrusion product with a production facility according to the first and/or the second aspect of the invention and/or the advantages of a method for indirectly deriving a systematic dependence in a production process for an extrusion product according to the third aspect of the invention and/or the advantages of a method for adapting the quality of an extrusion product manufactured with a production facility according to the fourth aspect of the invention and/or the advantages of a method for starting a production process for an extrusion product with a production facility according to the fifth aspect of the invention, as described above, directly extend to a method for manufacturing an extrusion product, where an extruder is operated for plastification of a thermoplast, where during manufacturing a method according to the first and/or the second and/or the third and/or the fourth and/or fifth aspect of the invention is performed.

It is explicitly pointed out that the subject matter of the sixth aspect can advantageously be combined with the subject matter of the above aspects of the invention, both individually and cumulatively in any combination.

In a seventh aspect of the invention, the task is solved by a plant for manufacturing an extrusion product, the plant having an extruder for plastification of a thermoplastic material and a nozzle for the exit of the plastic, the plant having a data processing and evaluation unit, the data processing and evaluation unit having a programming system, the programming system being adapted for performing a method according to the first and/or the second and/or the third and/or the fourth and/or the fifth and/or sixth aspect of the invention.

It is understood that the advantages of a method for monitoring a production process for an extrusion product with a production facility according to the first and/or the second aspect of the invention and/or the advantages of a method for indirectly deriving a systematic dependence in a production process for an extrusion product according to the third aspect of the invention and/or the advantages of a method for adapting the quality of an extrusion product manufactured with a production facility according to the fourth aspect of the invention and/or the advantages of a method for starting a production process for an extrusion product with a production facility according to the fifth aspect of the invention and/or the advantages of a method of manufacturing an extrusion product according to the sixth aspect of the invention, as described above, directly extend to a method for manufacturing an extrusion product, where an extruder is operated for plastification of a thermoplastic material, where during manufacturing a method according to the first and/or the second and/or the third and/or the fourth and/or the fifth and/or sixth aspect of the invention is performed.

Preferably, the plant has a setting parameter measurement system for determining a setting parameter of the production process.

Some terminology will be explained in the following:

A "measurement system" is a system for detecting a measured value. The output value of the measurement system is a measured value.

A "setting parameter measurement system" numerically determines the value of a setting parameter.

Advantageously, in this manner, the actual values of a setting parameter can be determined in time, without time delay, and can be used in a method according to one of the above aspects of the invention.

Thus, it can advantageously be achieved that the operator of a production facility does not have to manually read out the actual values of a setting parameter and does not have to enter them in the data processing and evaluation unit.

In particular, the precision with which an actual value of a setting parameter is determined can advantageously be increased in this manner.

Optionally, the plant has a measurement value measuring system for determining a measured value of the production process, in particular a process variable.

Some terminology will be explained in the following:

A "measurement value measuring system" numerically determines the value of a measured variable.

Advantageously, in this manner, the actual values of a process variable can be determined in time, without time delay, and can be used for a method according to one of the above aspects of the invention.

Thus, advantageously, the operator of a production facility does not have to manually read out the actual values of a process variable and does not have to enter them in the data processing and evaluation unit.

In particular, the precision with which an actual value of a process variable is determined can advantageously be increased in this manner.

Preferably, the plant has a property measurement system for determining an intensity of a property of the extrusion product in-line.

Some terminology will be explained in the following:

A "property measurement system" numerically determines the value or the intensity of a property, that is, the "property value". A "property desired value" is the default value for a property.

"In-line" is intended to mean that an intensity of a property of the extrusion product is determined during ongoing production of the extrusion product. For instance, an intensity of a property of the extrusion product can be determined in-line by having a sensor determine an intensity of a property by means of the material flow of the extrusion product passing by the sensor.

Advantageously, in this manner, an intensity of a property of the extrusion product can be determined in time, without time delay, and can be used for a method according to one of the above aspects of the invention.

Thus, advantageously, the operator of a production facility does not have to manually record the intensity of a property of the extrusion product and does not have to enter it in the data processing and evaluation unit.

In particular, the precision with which an intensity of a property of the extrusion product is determined can advantageously be increased in this manner.

In a particularly preferred embodiment, the plant has an actuator for influencing the quality of the extrusion product in-line by means of segmented actuating zones.

Advantageously, in this manner, setting a desired value of a setting parameter can take place segment by segment, improving the properties of the extrusion product.

It is explicitly pointed out that the subject matter of the seventh aspect can advantageously be combined with the subject matter of the above aspects of the invention, both individually and cumulatively in any combination.

In this respect, it is explicitly pointed out that when the "aspects of the invention" can be combined, this means that any embodiment of one aspect of the invention can be implemented together with any embodiment of one or more other aspects of the invention, unless in special cases two characteristics contradict each other. Thus, the cumulations of the characteristics of two (or more) aspects of the invention are to be understood as disclosed as well.

In the following, the invention will be explained in more detail by means of an example of embodiment with reference to the drawing wherein FIG. 1 schematically shows a plant for manufacturing an extrusion product.

The plant 1 in FIG. 1 for manufacturing an extrusion product 8 consists, among other components (not shown) from a production facility 2, a data acquisition and evaluation unit 3, a database 4, a setting parameter measurement system 5, a process value measurement system 6 and a property measurement system 7.

Via the data connection 9, the data acquisition and evaluation unit 3 is connected with the database 4 for data exchange.

Furthermore, the data processing and evaluation unit 3 is connected with the process value measurement system 6 for data exchange via the data connection 10, with the setting parameter measurement system 5 for data exchange via the data connection 11 and for data exchange with the property measurement system 7 via the data connection 12.

The data acquisition and evaluation unit 3 is adapted for performing a method according to the first, the second, the third, the fourth, the fifth and the sixth aspect of the invention.

The production facility 2 has the setting parameters 20, 21, 22 and the process variables 30, 31, 32. It is explicitly pointed out here that the production facility 2 can also have more or less than the indicated setting parameters 20, 21, 22, and also more or less than the indicated process variables 30, 31, 32. The setting parameters 20, 21, 22 and process variables 30, 31, 32 and their number are to be understood as schematic examples.

For manufacturing the extrusion product 8 with the plant 1, in addition the process variables 40, 41, 42 are relevant the number of which is also to be understood as a schematical example. The additional process variables 40, 41, 42 are present in the environment of the production facility 2 and can be, for instance, the air temperature 40, the air humidity 41 and the air pressure 42. It is understood that the number of process variables 40, 41, 42 in the environment of the production facility 2 selected here is also to be understood as a schematic example.

The extrusion product 8 has the properties 50, 51, 52, where it is explicitly pointed out here as well that the number of properties 50, 51, 52 is to be understood as a schematic example.

The intensity of the property 50 is determined by means of the property sensor 53 which is connected to the property measurement system 7 for data exchange via the data connection 54.

The intensity of the property 51 is determined by means of the property sensor 55 which is connected to the property measurement system 7 for data exchange via the data connection 56.

The intensity of the property 52 is determined by means of the property sensor 57 which is connected to the property measurement system 7 for data exchange via the data connection 58.

If required, the property measurement system 7 controls the property sensors 53, 55, 57, supplies them with energy, digitalizes, if required, the data arriving via the data connections 54, 56, 58, determines the intensities of the properties 50, 51, 52 at a fixed point in time defined by the data acquisition and evaluation unit 3 and forwards them to the data acquisition and evaluation unit 3 via the data connection 12.

The actual value of the setting parameter 20 is determined by the selectively combined setting parameter sensor and setting parameter encoder 23 which is connected to the setting parameter measurement system 5 for data exchange via the data connection 24.

The actual value of the setting parameter 21 is determined by the selectively combined setting parameter sensor and setting parameter encoder 25 which is connected to the setting parameter measurement system 5 for data exchange via the data connection 26.

The actual value of the setting parameter 22 is determined by the selectively combined setting parameter sensor and setting parameter encoder 27 which is connected to the setting parameter measurement system 5 for data exchange via the data connection 28.

If required, the setting parameter measurement system 5 controls the selectively combined setting parameter sensors and setting parameter encoders 23, 25, 27, supplies them with energy, digitalizes, if required, the data arriving via the data connections 24, 26, 28, determines the actual values of the properties 20, 21, 22 at a fixed point in time predefined by the data acquisition and evaluation unit 3 and forwards these data to the data acquisition and evaluation unit 3 via the data connection 11.

The actual value of the process variable 30 is determined by the process variable sensor 33 which is connected to the process variable measurement system 6 for data exchange via the data connection 34.

The actual value of the process variable 31 is determined by the process variable sensor 35 which is connected to the process variable measurement system 6 for data exchange via the data connection 36.

The actual value of the process variable 32 is determined by the process variable sensor 37 which is connected to the process variable measurement system 6 for data exchange via the data connection 38.

The actual value of the process variable 40 is determined by the process variable sensor 43 which is connected to the process variable measurement system 6 for data exchange via the data connection 44.

The actual value of the process variable 41 is determined by the process variable sensor 45 which is connected to the process variable measurement system 6 for data exchange via the data connection 46.

The actual value of the process variable 42 is determined by the process variable sensor 47 which is connected to the process variable measurement system 6 for data exchange via the data connection 48.

If required, the process variable measurement system 6 controls the process variable sensors 33, 35, 37, 43, 45, 47, supplies them with energy, digitalizes, if required, the data arriving via the data connections 34, 36, 38, 44, 46, 48, determines the actual values of the process variables 30, 31, 32, 40, 41, 42 at a fixed point in time predefined by the data acquisition and evaluation unit 3 and forwards these data to the data acquisition and evaluation unit 3 via the data connection 10.

In addition to other tasks, the data acquisition and evaluation unit 3 is responsible for controlling the setting parameters 20, 21, 22 of the production facility 2 and thus for controlling manufacturing of the extrusion product 8. Among the predefined process variables 30, 31, 32, 40, 41, 42, which cannot be directly influenced in the example in FIG. 1, among others the properties 50, 51, 52 of the extrusion product 8 are to be adapted in an optimum manner.

This adaptation of the properties 50, 51, 52 of the extrusion product 8 takes place by means of an adaptation of the desired values of the setting parameters 20, 21, 22 of the production facility 2 via the selectively combined setting parameter sensors and setting parameter encoders 23, 25, 27. For this purpose, the selectively combined setting parameter sensors and setting parameter encoders 23, 25, 27 are connected via the data connections 60, 61, 62, to the data acquisition and evaluation unit 3 which for this purpose carries out a method according to the fourth aspect of the invention.

LIST OF REFERENCE NUMBERS

1 plant
2 production facility
3 data acquisition and evaluation unit
4 database
5 setting parameter measurement system
6 process variable measurement system
7 property measurement system
8 extrusion product
9 data connection
10 data connection
11 data connection
12 data connection
20 setting parameter
21 setting parameter
22 setting parameter
23 setting parameter sensor and setting parameter encoder
24 data connection
25 setting parameter sensor and setting parameter encoder
26 data connection
27 setting parameter sensor and setting parameter encoder
28 data connection
30 process variable
31 process variable
32 process variable
33 process variable sensor
34 data connection
35 process variable sensor
36 data connection
37 process variable sensor
38 data connection
40 process variable air temperature
41 process variable air humidity
42 process variable air pressure
43 process variable sensor
44 data connection
45 process variable sensor
46 data connection
47 process variable sensor
48 data connection
50 property
51 property
52 property
53 property sensor
54 data connection
55 property sensor
56 data connection
57 property sensor
58 data connection
60 data connection
61 data connection
62 data connection

The invention claimed is:

1. A method for monitoring a production process for an extrusion product by means of a production facility, the method comprising:
   measuring a current value of a process variable of the production process with a sensor;
   comparing the measured process value to a predefined desired process value;
   determining an actual value of a setting parameter of the production facility from a production of the extrusion product; and
   comparing the determined actual value of the setting parameter to a predefined desired value of the setting parameter,
   wherein a deviation of the determined actual value of the setting parameter from the desired value of the setting parameter and/or of the measured process value from the desired process value is indicated, and
   wherein by means of existing comparative data for an extrusion product defined by requirements on at least one property of the extrusion product performing a sensitivity analysis by:
   receiving a fingerprint that represents a combination of actual values of setting parameters and process variables recorded during production of the extrusion product;
   analyzing the fingerprint to identify normal operating ranges for the setting parameters and process variables that yield acceptable product properties;
   establishing warning ranges and alarm ranges around the normal operating ranges, wherein the warning range is larger than the normal range and the alarm range is larger than the warning range;

evaluating Pareto fronts between individual influencing values to determine how the individual influencing values condition and interact with one another while simultaneously optimizing multiple quality criteria; and determining correlations between deviations from the normal operating ranges and resulting changes in product properties, and the actual values of the setting parameters, the measured process value, a property value, or a desired value of the setting parameter is stored in a data processing and evaluation unit or a database, and determining the sensitivity of the production process to a desired fingerprint and the current value of the fingerprint, and proactively intervening in the production process based on the determined sensitivity and the current value of the fingerprint by adapting process parameters when measured values deviate from the normal range but remain within the warning range to enable timely operator action that returns the process to the normal range before measured values enter the alarm range, wherein the adaptation is based on both (i) the determined correlations between range deviations and property changes and (ii) analysis of the Pareto fronts that quantifies interdependencies between variables while maintaining multiple quality criteria within specified ranges.

2. The method according to claim 1, wherein the setting parameter desired value and/or the desired value of the measured value are defined in dependence on a production process development parameter.

3. The method according to claim 1, wherein the setting parameter desired value and/or the desired value of the measured value for a stationary or quasi-stationary production process are defined and/or the setting parameter desired value or the desired value of the measured value are defined during the production process at a time after startup of the production process.

4. The method according to claim 1, wherein indication of the deviation of at least the setting parameter actual value from the setting parameter desired value and/or of the measured value from the desired value of the measured value correspond to ranges of the setting parameter desired value and/or of the desired value of the measured value, with a normal state being indicated if the setting parameter actual value and/or the measured actual value lie within the normal range, a warning state being indicated if the setting parameter actual value and/or the measured actual value lie within the warning range and outside the normal range, and an alarm state being indicated if the setting parameter actual value and/or the measured actual value lie within the alarm range and outside the warning range.

5. The method according to claim 1, wherein the setting parameter desired value and/or a deviating desired value of the measured value are predefined during the production process by an operator of a machine.

6. The method according to claim 1, wherein the setting parameter desired value and/or a deviating desired value of the measured value are predefined by the data processing and evaluation unit.

7. The method according to claim 1, wherein the setting parameter desired value and/or a deviating desired value of the measured value are selected using a formulation of the extrusion product.

8. The method according to claim 1, further comprising: storing at least one of the setting parameter actual value, the measured value, a property value, a setting parameter desired value, a desired value of the measured value, a property desired value, a normal range of a setting parameter desired value, for a range of a desired value of the measured value, of a property desired value, a warning range of a setting parameter desired value, for the range of a desired value of the measured value, of a property desired value, an alarm range of a setting parameter desired value, and for the range of a desired value of the measured value and/or of a property desired value, in the database, wherein an existing database is expanded continuously.

9. The method according to claim 1, further comprising: storing at least one of the setting parameter actual value, the measured value, a property value, a setting parameter desired value, a desired value of the measured value, a property desired value, a normal range of a setting parameter desired value, a range of a desired value of the measured value, of a property desired value, a warning range of a setting parameter desired value, for the range of a desired value of the measured value, of a property desired value, an alarm range of a setting parameter desired value, and for the range of a desired value of the measured value and/or of a property desired value, in the database, the database containing only data of a specific production facility for producing one extrusion product.

10. The method according to claim 1, further comprising: storing at least one of the setting parameter actual value, the measured value, a property value, a setting parameter desired value, a desired value of the measured value, a property desired value, a normal range of a setting parameter desired value, for a range of a desired value of the measured value, of a property desired value, a warning range of a setting parameter desired value, for the range of a desired value of the measured value, of a property desired value, an alarm range of a setting parameter desired value, and for the range of a desired value of the measured value and/or of a property desired value, in the database, the database containing data from a plurality of production facilities for producing an extrusion product of identical kind.

11. The method according to claim 1, further comprising: storing at least one of the setting parameter actual value, the measured value, a property value, a setting parameter desired value, a desired value of the measured value, a property desired value, a normal range of a setting parameter desired value, for a range of a desired value of the measured value, of a property desired value, a warning range of a setting parameter desired value, for the range of a desired value of the measured value, of a property desired value, an alarm range of a setting parameter desired value, and for the range of a desired value of the measured value and/or of a property desired value, in the database, the database containing data from a plurality of production facilities for producing an extrusion product of different kind.

12. The method according to claim 1, further comprising: storing at least one of the setting parameter actual value, the measured value, a property value, a setting parameter desired value, a desired value of the measured value, a property desired value, a normal range of a setting parameter desired value, for a range of a desired value of the measured value and/or of a property desired value, a warning range of a setting parameter desired value, for the range of a desired value of the measured value and/or of a property desired value, an alarm range of a setting parameter desired value, and for the range of a desired value of the measured value and/or of a property desired value, in the database, the database containing the data of production facilities for producing an extrusion product from one producer and/or from many producers.

13. The method according to claim 1, further comprising: storing at least one of the setting parameter actual value, the measured value, a property value, a setting parameter desired value, a desired value of the measured value, a property desired value, a normal range of a setting parameter desired value, for a range of a desired value of the measured value and/or of a property desired value, a warning range of a setting parameter desired value, for the range of a desired value of the measured value and/or of a property desired value, an alarm range of a setting parameter desired value, and for the range of a desired value of the measured value and/or of a property desired value, are stored in the database, the database synchronizing the data with a site-independent storage.

14. A method for manufacturing an extrusion product, wherein an extruder is operated for plastification of a thermoplastic material, a method according to claim 1 being performed during manufacturing.

15. The method according to claim 1, further comprising: storing a desired value of the measured value, a property desired value, a normal range of a setting parameter desired value, for a range of a desired value of the measured value, of a property desired value, a warning range, of a setting parameter desired value, for the range of a desired value of the measured value, of a property desired value, an alarm range, of a setting parameter desired value, and for the range of a desired value of the measured value and/or of a property desired value in a data processing and evaluation unit and/or in the database.

* * * * *